United States Patent

Birchak et al.

[11] Patent Number: 6,125,079
[45] Date of Patent: Sep. 26, 2000

[54] SYSTEM AND METHOD FOR PROVIDING DUAL DISTANCE TRANSDUCERS TO IMAGE BEHIND AN ACOUSTICALLY REFLECTIVE LAYER

[75] Inventors: James R. Birchak, Spring; Batakrishna Mandal, Missouri City; James E. Masino, Houston; John W. Minear, Hudson; Thomas E. Ritter, Katy, all of Tex.

[73] Assignee: Gas Research Institute, Chicago, Ill.

[21] Appl. No.: 08/856,113

[22] Filed: May 14, 1997

[51] Int. Cl.⁷ .................. G01V 1/40; G01V 1/00
[52] U.S. Cl. ............... 367/35; 367/28; 181/104; 181/106
[58] Field of Search .................. 367/28, 35, 69; 340/55; 181/176, 106, 104

[56] References Cited

U.S. PATENT DOCUMENTS

| | | | |
|---|---|---|---|
| 3,265,151 | 8/1966 | Anderson | 181/0.5 |
| 3,668,619 | 6/1972 | Dennis | 340/15.5 BH |
| 3,736,552 | 5/1973 | Sessler et al. | 340/5 MP |
| 3,745,812 | 7/1973 | Korpel | 73/67.5 R |
| 3,747,702 | 7/1973 | Beil | 181/0.5 BE |
| 3,978,939 | 9/1976 | Trouiller | 340/55 |
| 4,003,244 | 1/1977 | O'Brien et al. | 73/67.8 R |
| 4,130,816 | 12/1978 | Vogel et al. | 340/15.5 BH |
| 4,197,921 | 4/1980 | Alphonse et al. | 181/176 |
| 4,255,798 | 3/1981 | Havira | 367/35 |
| 4,283,953 | 8/1981 | Plona | 73/589 |
| 4,293,933 | 10/1981 | Park et al. | 367/25 |
| 4,524,433 | 6/1985 | Broding | 367/25 |
| 4,596,143 | 6/1986 | Norel | 73/598 |
| 4,601,024 | 7/1986 | Broding | 367/86 |
| 4,607,352 | 8/1986 | Seeman et al. | 367/35 |
| 4,641,724 | 2/1987 | Chow et al. | 367/28 |
| 4,665,511 | 5/1987 | Rodney et al. | 367/35 |
| 4,685,091 | 8/1987 | Chung et al. | |
| 4,685,092 | 8/1987 | Dumont | 367/35 |
| 4,703,427 | 10/1987 | Catala et al. | 364/422 |
| 4,709,357 | 11/1987 | Maki, Jr. | 367/35 |
| 4,727,591 | 2/1988 | Manlove | 455/182 |
| 4,733,380 | 3/1988 | Havira | 367/35 |

(List continued on next page.)

FOREIGN PATENT DOCUMENTS

| | | | |
|---|---|---|---|
| 2011437 | 9/1990 | Canada | G01V 1/40 |
| 0549419 A2 | 6/1993 | France | G01V 1/40 |
| 2249629 | 5/1992 | United Kingdom | G01N 29/16 |

*Primary Examiner*—Christine Oda
*Assistant Examiner*—Anthony Jolly
*Attorney, Agent, or Firm*—Pauley Peterson Kinne & Fejer

[57] ABSTRACT

A transducer configuration for use in acoustically imaging a target region behind an acoustically reflective layer includes a sonde having a geometrical center and constructed and arranged to support a plurality of transducers. The system includes a first transducer disposed within the sonde at a first distance from the geometrical center for generating a first acoustic pulse and for receiving a first acoustic signal. The acoustic signal comprises a first reflection from the reflective surface, a first set of fluid multiples arising from reflections between the reflective layer and a surface of the first transducer, and a first signal associated with the target area. The system also includes a second transducer disposed within the sonde at a second distance from the geometrical center for generating a second acoustic pulse and for receiving a second acoustic signal. The second acoustic comprises a second reflection from the reflective surface, a second set of fluid multiples arising from reflections between the reflective layer and a surface of the second transducer and a second signal associated with the target area. A mechanism for receiving and processing signals received by the first and second transducers at time intervals which occur between receipt of the first and second sets of fluid multiples, respectively, wherein signal values at time intervals between receipt of fluid multiples provide acoustic waveforms associated with the target region. Each target region, therefore, has a time interval on at least one of the two waveforms which is free of fluid multiples.

21 Claims, 12 Drawing Sheets

U.S. PATENT DOCUMENTS

| | | | |
|---|---|---|---|
| 4,805,156 | 2/1989 | Attali et al. | 367/35 |
| 4,852,069 | 7/1989 | Clerke et al. | 367/69 |
| 4,867,264 | 9/1989 | Siegfried | 181/105 |
| 4,885,723 | 12/1989 | Havira et al. | 367/35 |
| 4,928,269 | 5/1990 | Kimball et al. | 367/35 |
| 4,999,817 | 3/1991 | Zimmer | 367/65 |
| 5,001,676 | 3/1991 | Broding | 367/31 |
| 5,031,155 | 7/1991 | Hsu | 367/25 |
| 5,081,613 | 1/1992 | Holzhausen et al. | 367/86 |
| 5,097,482 | 3/1992 | Serizawa et al. | 375/12 |
| 5,146,050 | 9/1992 | Strozeski et al. | 181/102 |
| 5,162,994 | 11/1992 | Torres | 364/422 |
| 5,164,548 | 11/1992 | Angehrn | 181/103 |
| 5,184,623 | 2/1993 | Mallart | 128/661.01 |
| 5,212,353 | 5/1993 | Rambow et al. | 181/106 |
| 5,214,614 | 5/1993 | Baule | 367/58 |
| 5,216,638 | 6/1993 | Wright | 367/35 |
| 5,228,006 | 7/1993 | Sheriff | 367/103 |
| 5,228,007 | 7/1993 | Murakami et al. | 367/103 |
| 5,233,993 | 8/1993 | Kawano et al. | 128/660.07 |
| 5,235,857 | 8/1993 | Anderson . | |
| 5,235,983 | 8/1993 | Iida et al. | 128/660.07 |
| 5,235,984 | 8/1993 | D'Sa | 128/660.07 |
| 5,245,586 | 9/1993 | Hassler | 367/12 |
| 5,249,577 | 10/1993 | Shinomura et al. | 128/660.05 |
| 5,251,047 | 10/1993 | Kizu et al. | 358/471 |
| 5,257,265 | 10/1993 | Su et al. | 370/100.1 |
| 5,377,160 | 12/1994 | Tello et al. | 367/35 |
| 5,392,652 | 2/1995 | Levesque et al. | 73/629 |
| 5,418,335 | 5/1995 | Winbow | 181/106 |
| 5,491,668 | 2/1996 | Priest | 367/35 |

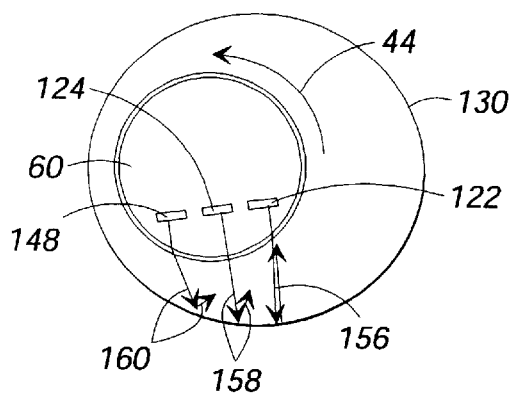
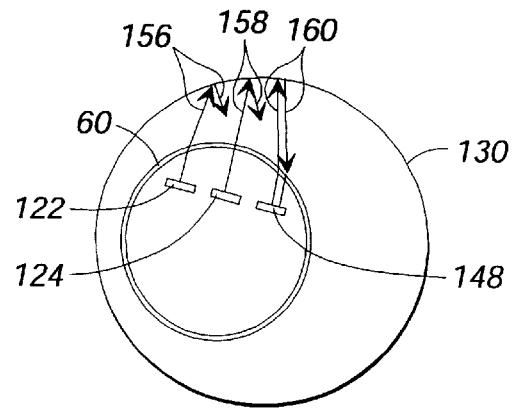
FIG. 30  FIG. 31
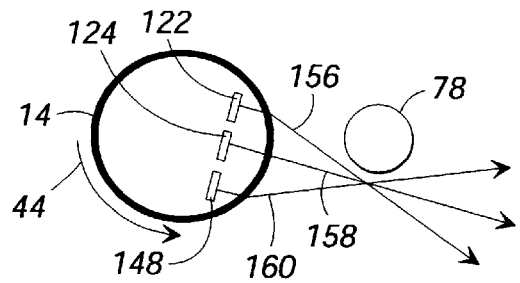
FIG. 32a
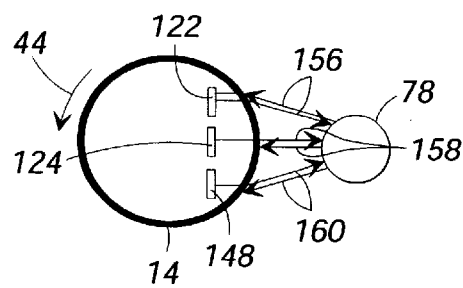
FIG. 32b
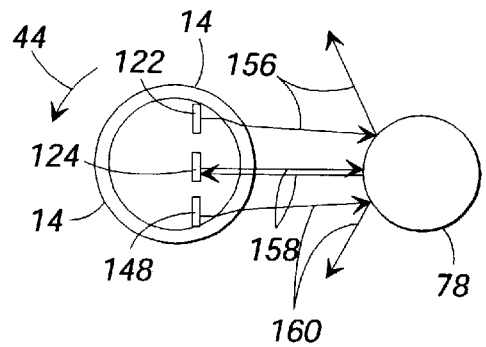
FIG. 33

SYSTEM AND METHOD FOR PROVIDING DUAL DISTANCE TRANSDUCERS TO IMAGE BEHIND AN ACOUSTICALLY REFLECTIVE LAYER

RELATED CO-PENDING APPLICATIONS

The following related applications are co-pending: (1) Utility application Ser. No. 08/856,115, filed on May 14, 1997, entitled "Sensor Configuration For Nulling Reverberations To Image Behind Reflective Layers;" (2) Utility application Ser. No. 08/856,114, filed on May 14, 1997, entitled "A System And Method For Processing Acoustic Signals To Image Behind Reflective Layers;" and (3) Utility application Ser. No. 08/856,112, filed on May 14, 1997, entitled "Transducer Configuration Having A Multiple Viewing Position Feature."

FIELD OF THE INVENTION

The present invention relates to the non-invasive investigation of the integrity of a structural layer disposed between multiple structural layers. More specifically, the present invention relates to a system for imaging portions of a structural layer which are disposed behind an acoustically reflective layer, wherein the acoustically reflective layer has a greater acoustic impedance than the structural layer.

BACKGROUND OF THE INVENTION

In drilled wells, a steel casing is set within a wellbore formation to maintain the structural integrity of the entire well and to prevent the wellbore walls from collapsing inward. An annular region defined by the space between the steel casing and the wellbore formation is commonly filled with cement to stabilize the steel casing and to prevent fluid communication between vertically stratified geological zones. This cement must be inspected to confirm its structural integrity and to assure a complete sealing of the annulus between the steel casing and wellbore formation.

Imaging tools which are lowered into the open hole utilizing an electric wireline or cable typically construct a graphic representation of acoustic reflection properties and calculate acoustic travel times from the tool exterior to the wellbore wall. The graphic representation approximates a visual image of the wellbore wall.

Steel has a greater acoustic impedance than the impedances of fluids disposed between the imaging tool and the steel casing. Steel also has a greater acoustic impedance than the cement disposed outside the steel casing. As a result, reflective reflections from inner and outer surfaces of the steel casing frustrate attempts to image areas within the cement located an inch or more behind casing. More specifically, multiple acoustic reflections in the wellbore fluid and within the casing occur simultaneously with the arrival of acoustic reflections from the cement onto the acoustic sensors. Furthermore, strong impedance mismatches at the wellbore fluid-steel and steel-cement boundaries greatly decrease energy propagating into the cement and returning from reflectors in cement and back to the acoustic sensors, therefore increasing the difficulty of imaging the concrete. In drilled wells, steel casing is installed to maintain integrity and to prevent walls from caving. The annular region between casing and formation is filled with cement to prevent fluid communication between different geological zones. This cement must be inspected to confirm complete sealing of the annulus between casing and formation.

Steel has large acoustic impedance compared of fluid inside casing and cement outside casing. The resulting reverberation of energy trapped in casing makes it difficult to image reflectors located behind casing. Multiple reverberations in casing fluid and in casing occur simultaneously with the arrival of echoes from certain cement reflectors. Additionally, strong impedance mismatches at steel boundaries cause echoes from reflectors in cement to be much smaller than reverberation noise.

DESCRIPTION OF THE PRIOR ART

Many attempts have been made to image structures within wellbores, for example, U.S. Pat. No. 4,255,798 to Havira uses a single transducer which acts as transmitter and receiver in a configuration (pulse-echo) which has a complete overlap of transmitter and receiver radiation patterns and therefore strong reverberations, which precludes the processing of weak acoustic signals from reflected from low acoustic impedance materials with respect to high acoustic impedance steel.

U.S. Pat. No. 5,216,638 to Wright describes a technique for identifying casing thickness and cement acoustic impedance from pulse-echo measurements, however the method also generates unacceptably large reverberations from high acoustic impedance.

U.S. Pat. No. 4,999,817 to Zimmer shows a method which utilizes acoustic pulse-echo techniques for describing a circumferential angle of wellbore casing locations which produce large acoustic reverberations resulting from a poor bond at the steel-cement interface between the wellbore casing and cement sealing structure. This method, however, also produces large reverberations, which precludes the sensing of portions of concrete located radially beyond the steel-cement interface.

European Patent Application No. 0 519 419 A2 to Stanke et al. utilizes a sensing system which comprises separate acoustic transmitter and receiver transducers (hereinafter referred to as "pitch-catch"). Stanke et al. aim centers of the pitch-catch radiation patterns at reflectors of interest within the cement. Although that approach attempts to maximize the cement reflector signal, it does not assure that the casing reverberation and casing refracted acoustic waves are minimized. The reflector signal to reverberation noise ratio is therefore not optimized. Furthermore, the imaging method disclosed by Stanke et al. does not take into account the varying travel times through different materials when opening inspection windows with low reverberation noise.

U.S. Pat. Nos. 4,601,024 and 5,001,676 to Broding disclose axial acoustic transducer configurations having intersecting radiation patterns with side-lobe detection for pitch-catch transducers. Those configurations, however, apply to wellbores which do not have steel casings. Therefore, that transducer configuration is specifically adapted to receive a strong acoustic signal from the first reflecting surface and does not attempt to null reflections from highly reflective surface materials for the express purpose of receiving reflected signals from less acoustically reflective material located between layers of reflective materials. Furthermore, Broding uses a variety of transducers, but does not use dual-distance techniques to reduce fluid reverberations.

U.S. Pat. No. 4,805,156 to Attali et al. avoids reverberations in mud between the casing and sensor array by placing transmitting and receiving transducers in pads that contact the casing surface. That approach, however, responds primarily to refracted waves and records attenuation of refracted waves due to energy loss from cement. Information is not obtained about reflectors within the concrete which are more than an inch behind the casing.

U.S Pat. Nos. 5,184,623 to Mallart; 5,233,993 to Kawano; 5,235,983 to O'Donnell; 5,228,006 to Sheriff; 5,228,007 to Murakami et al.; 5,251,047 to Kizu et al. describe prior art imaging systems which steered, focused sensor array systems. Those conventional arrays have small elements small as compared to the wavelength, which creates an inordinate amount of elements, which requires heavy processing capability by system hardware and therefore slows data processing considerably.

The prior art also demonstrates considerable effort in the evaluation of wellbore casings and surrounding cement. U.S. Pat. No. 5,162,994 to Torres teaches a method for interpreting surface roughness of the wellbore before casing is installed. U.S. Pat. No. 5,031,155 to Hsu describes a method for compressing acoustic signals downhole and reconstructing signals at the surface. U.S. Pat. No. 5,491,668 to Priest describes a method for interpreting the casing thickness. British Patent No. GB 2 249 629 A to Rutledge also describes a method for determining the properties of the cement behind casing. U.S. Pat. No. 5,212,353 to Rambow et al. describes a method for focusing borehole televiewer transducers. Canadian Patent No. 2,011,437 to Huau describes a method for calibrating a bore-hole televiewer transducer. None of the techniques disclosed above addresses imaging behind a highly reflective layer, however.

Other prior art acoustic methods have addressed beam shaping and imaging. For example, U.S. Pat. No. 5,392,652 to K. J. Levesque et al. describes a method for steering ultrasonic beams. U.S. Pat. No. 5,245,586 to Hassler describes a method for reducing reverberations in a sensing transducer. U.S. Pat. No. 5,257,265 to Su et al. also describes a method for reducing reverberation. Finally, U.S. Pat. Nos. 5,235,984 and 5,249,577 to D'Sa and Shinomura et al., respectively, describe methods of forming ultrasonic images. Each of those prior art references, however, utilizes only a single viewing perspective per viewing position, and do not address the problem of obtain information about material disposed behind a highly reflective layer.

In view of the forgoing disadvantages of the above-referenced prior art imaging and calipering devices, a first object of the present invention is to provide an acoustic transducer configuration which calipers and images a first material disposed behind a second material, wherein the second material has a higher acoustic impedance than the first material.

Another objective is to process signals from acoustic transducers to minimize reverberation noise compared to echoes received from reflectors in cement.

Another object of the present invention is to provide individual transducer elements having an exposed area with dimensions that are larger compared than the transducer operating wavelength.

Another object of the present invention is to provide an instrument that utilizes relatively few elements to perform multiple direction and multiple distance inspections.

Another object of the present invention is to provide a system which processes transducer data at significantly faster speed than with steered, focused transducer arrays to image a material behind a highly reflective layer.

SUMMARY OF THE INVENTION

Generally speaking, the present invention relates to system and method for acoustically imaging a target region designed and acoustically reflective layer, wherein the system includes the transducer configuration for acquiring acoustic image data from a target region disposed behind an acoustically reflective layer. Specifically, the present invention relates to a system and method for processing data received from the target region by receiving transducers which dectect a first arrival of a first acoustic reflection signal which is associated with a first acoustic pulse from at least one transmitting transducer. A system in accordance with the present invention includes a mechanism for suppressing multiple reflected signals originating from the first acoustic pulse, wherein the suppressing mechanism facilitates the acquisition of image data from the target region disposed behind the reflective layer.

To effectively suppress unwanted reverberation signals received from a surface of the reflective material, the suppressing mechanism includes a mechanism for calculating and storing to a computer memory a peak value of the first acoustic reflection signal, a mechanism for establishing a threshold signal based on the first acoustic reflection signal for storing that signal to memory, a searching mechanism for searching the memory and identifying threshold signal values within the first acoustic reflection signal, and a mechanism for canceling the multiple reflected signals, thereby facilitating acquisition of acoustic data originating from the target region. More specifically, the suppressing mechanism utilizes an adaptive multiplier mechanism for detecting reflected signal values above the threshold value to cancel those reflective signal values which are received by the receiving transducer from the first acoustic pulse.

The adaptive multiplier mechanism includes a time measurement mechanism for determining the arrival time between the first pulse and the first reflection, a storage mechanism for storing arrival times to computer memory, a mechanism for creating a canceling signal having amplitude valleys therein, a mechanism for calculating the starting edge of each value as a multiple of arrival time of the first reflection, and a mechanism for adding the canceling signal multiple value at the starting edge of each reflection signal to cancel reverberations which are received subsequent to the first reflection, thereby enhancing acoustic signal strength received from the target area with respect to reverberation signal strength. The system in accordance with the present invention may also utilize a frequency filter coupled to an output of the receiving transducer to enhance the first reflection signals received from the target area and a mechanism for identifying different reflections from separate transmitting transducers.

The present invention also relates to a system for adaptively compressing and transmitting acoustic signal data from a subterranean location within a wellbore along a wireline to an above ground computing means for reassembling the data and for transforming the acoustic data into image data. The data compression mechanism may include but is not limited to a bandpass filter for filtering out undesired reflection frequencies from the reflection signal, a mechanism for performing a Fourier transformation on the reflection signal, a mechanism for transmitting the Fourier transformed signal uphole, and a mechanism for performing an inverse Fourier transformation of the transformed signals to recreate the reflection signal. The data compression mechanism may further comprise a mechanism for converting reflection signal waveforms having a distinct pattern within a data plane into a wavelet transform having a relative small number of coefficients for narrow bandwidth transmission to the above ground computing means, and a mechanism for reconstructing the data plane using an inverse wavelet transform.

The inventive system also comprises a sonde attached via a wireline to a logging truck, wherein the wireline allows the sonde to be lowered into the wellbore. The sonde includes a rotatable sonde head for supporting and housing the transducer configuration when the sonde head rotates the transducer configuration for azimuthally interrogating multiple portions of the target region. The system also includes a means for moving the sonde in an axial direction for axially interrogating multiple portions of the target region, and a control mechanism for adjusting the axial and azimuthal sonde head movement to allow the transducer configuration to acquire overlapping data in the azimuthal and axial directions, wherein overlapping in the azimuthal direction assures occlusion detection within the target region during each complete rotation of the sonde head.

The transducer configuration of the inventive system may comprise at least two transmitting transducers wherein each of the transducers includes a separate radiation pattern. The radiation pattern of each transducer intersects in an intersection voxel within the target region, wherein the intersection voxel is interrogated by all transducers for a given azimuthal position of the sonde head to identify the location and orientation of any reflective boundary which may exist in the intersection voxel. In this regard, the system also includes a mechanism for comparing the reflection signal amplitude received from each of the transmitting transducers floor selecting which voxel contains reflective surfaces. Furthermore, the transducer within the transducer configuration producing the strongest reflection amplitude signal from the voxel identifies the refracted angle, thereby giving an orientation of a normal of the reflecting surface. Once the orientation of the normal to the reflective surface is determined, the orientation of an entire occlusion or channel through the target area may be ascertained after interrogation of adjacent voxels.

The present invention also relates to the method for use within a system which utilizes the transducer configuration for acquiring acoustic image data from a target region disposed behind and acoustically reflective layer, wherein the method processes the acoustically acquired data to image the target region and wherein the reflective layer and target region are divided into voxels circumferentially disposed about a central point for examination. More specially, the method comprises the steps of transmitting a first acoustic pulse, detecting a first arrival of a first acoustic reflective signal associated with the first acoustic pulse, and suppressing multiple reflective signals from the first acoustic pulse to facilitate the acquisition of image data from the target region. Furthermore, the inventive method may also comprise the steps of calculating and storing to memory a peak value of the acoustic reflection signal, establishing a threshold signal of value based on the first acoustic reflection signal value, storing the threshold signal to memory, searching the memory and identifying threshold signal values in the first acoustic signal, and canceling the multiple reflective signals from the first acoustic reflective signal.

The present invention may also include the steps of detecting reflective signal values above the threshold value and canceling those reflective signal values which are received by the receiving transducer from the first acoustic pulse. In the that regard, the inventive method may also include the steps of determining the arrival time between the first pulse and the first reflection, restoring the arrival times to memory, and generating the canceling signal having amplitude valleys therein, calculating the starting edge of each value as a multiple of the arrival time of the first reflection, and adding the canceling signal multiple value at the starting edge of each reflection signal to cancel reverberations which are received subsequent to the first reflective signal thereby enhancing acoustic signal strength received from the target area with respect to reverberation signal strength.

The inventive method may also include the step of frequency filtering the output of a receiving transducer to enhance signals associated with the target area. The inventive method may also comprise the steps of bandpass filtering the reflection signal data for enhancing the first reflection signals and compressing receiving transducer signals for narrow bandwidth transmission to the surface for further image processing.

The present invention may also relate to a dual distance transducer configuration within a sonde having a geometrical center which is constructed and arranged to support a plurality of transducers, wherein a first transducer is disposed within the sonde at a first distance from the geometrical center. The first transducer may be adapted to generate a first acoustic pulse and may receive a first acoustic signal comprising a first reflection from the reflective surface, a first set of fluid multiples arising from reflections between the reflective layer and a surface of the first transducer, and a first signal associated with the target area.

The dual distance transducer configuration may also include a second transducer disposed within the sonde at a second distance from the geometrical center, wherein the second transducer generates a second acoustic pulse and receives a second acoustic signal comprising a second reflection from the reflective surface, a second set of fluid multiples arising from reflections between the reflective layer and a surface of the second transducer, and a second signal associated with the target area.

Furthermore, the dual distance transducer configuration may include a mechanism for receiving and processing signals received by the first and second transducers at time intervals which occur between receipt of the first and second sets of fluid multiples, respectively, wherein signal values at time intervals between receipt of fluid multiples provide acoustic waveforms associated with the target region without reverberation noise associated with the reflective layer, thereby enhancing signals associated with materials behind the reflective layer.

Another embodiment of the dual distance transducer may include a three transducer set. Specifically, the configuration may include a first transmitting transducer disposed within the sonde at a first distance from the geometrical center, wherein the first transducer includes a beamspread radiation pattern comprising a main lobe diverging from the first transducer, a side lobe disposed laterally adjacent to the main lobe, and a null region disposed between the main and side lobes, wherein the first transducer is adapted to generate a first acoustic pulse.

The second transducer comprises transmitting transducer disposed within the sonde at a second distance from the geometrical center, wherein the second transducer includes a beamspread radiation pattern comprising a main lobe diverging from the second transducer, a side lobe disposed laterally adjacent to the main lobe, and a null region disposed between the main and side lobes. The second transducer generates a second acoustic pulse.

The third transducer in the set is a receiving transducer vertically disposed beneath the first transducer and above the second transducer, and includes a receiving surface disposed at a nonparallel orientation with respect to a vertical plane for detecting echoes from the first and second transducers, wherein the receiving surface includes a receiving beamspread radiation pattern having a main lobe diverging therefrom receiving surface and the receiving beamspread pattern is constructed and arranged to sufficiently detect echoes from the first and second transmitting transducers, and wherein the nonparallel surface dissipates acoustic reflections therefrom, thereby mitigating reflections arising from the reflective layer.

The invention may also include a method for imaging behind a reflective layer comprising the steps of, placing a first transducer within the sonde at a first distance from the geometrical center, generating a first acoustic pulse with the first transducer, and receiving a first acoustic signal with the first transducer, wherein the first signal comprises a first reflection from the reflective surface, a first set of fluid multiples arising from reflections between the reflective layer and a surface of the first transducer, and a first signal associated with the target area.

The method may also include the step of placing a second transducer disposed within the sonde at a second distance from the geometrical center, generating a second acoustic pulse with said second transducer, and receiving a second acoustic signal with second transducer, wherein the signal comprises a second reflection from the reflective surface, a second set of fluid multiples arising from reflections between the reflective layer and a surface of the second transducer, and a second signal associated with the target area.

Finally, the inventive method may include processing signals received by the first and second transducers at time intervals which occur between receipt of the first and second sets of fluid multiples, respectively, wherein signal values at time intervals between receipt of fluid multiples provide acoustic waveforms associated with the target region, free of reverberations associated with the reflective layer.

BRIEF DESCRIPTION OF THE DRAWINGS

FIG. 30 illustrates a sonde head orientation for a clockwise angle beam transducer to detect cement-formation reflection for a lower half of an eccentered casing.

FIG. 31 illustrates a sonde head orientation so that a counterclockwise transducer obtains a cement-formation reflection from the eccentered casing.

FIG. 32(a) illustrates a schematic top view of the inventive transducer configuration aimed at a region having no occlusions or channels.

FIG. 32(b) illustrates a schematic top view of the inventive transducer configuration aimed at a region having a channel therethrough, wherein all transducers receive signals when the intersection point coincides with the center of the channel.

FIG. 33 illustrates an alternative embodiment of the transducer configuration shown in FIGS. 32(a-b), wherein the transducer orientation has a beam intersection point outside of the channel.

DETAILED DESCRIPTION OF THE INVENTION

Figure 1:
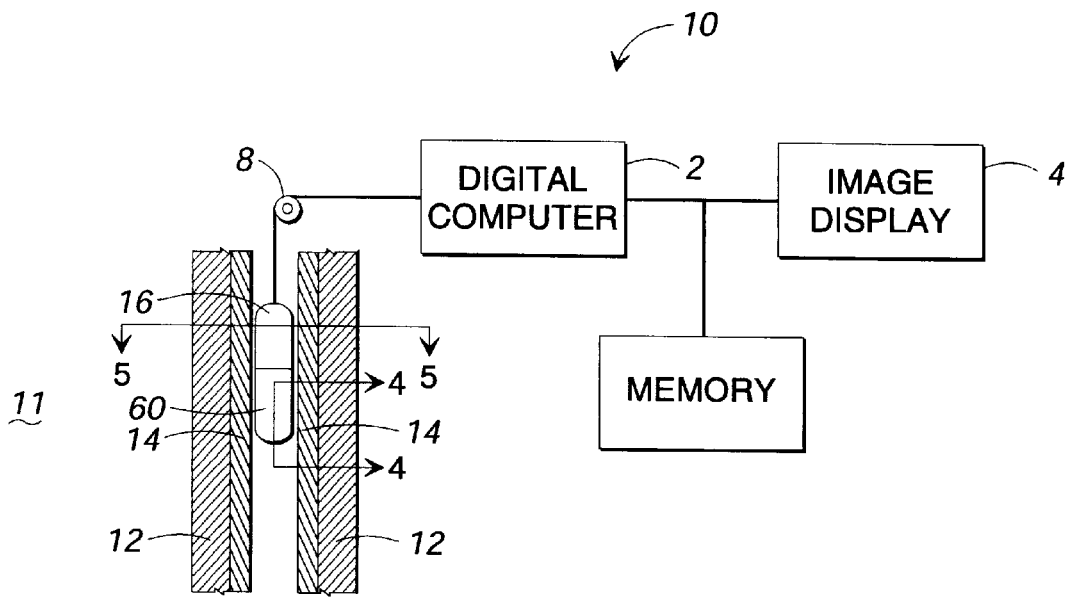
FIG. 1 illustrates a schematic view of a sonde disposed in a cased wellbore for the purpose of imaging and calipering various structural layers within the wellbore.

Referring now to the drawings, FIG. 1 illustrates an acoustic logging apparatus, shown generally as 10, located in a wellbore 13 in a subterranean formation. Wellbore 13 receives a cylindrical steel casing 14 therein for maintaining structural integrity of the wellbore 13 within the subterranean formation. An annular space between an outer periphery of the casing 14 and an inside surface of the wellbore 13 receives a cement pour 12 for bolstering the structural integrity of the of the wellbore 13 and for sealing various strata of the subterranean formation from one another.

The logging apparatus 10 may include, among other components, a reeling apparatus which winds and unwinds it wireline 8 from a wireline logging vehicle (not shown). Wireline suspends a centralized imaging tool or sonde 16 which may image various structural material layers within the wellbore 13. Generally, the sonde 16 may include a rotating head 60 at a bottom portion thereof for effectuating a complete circumferential image sweep of the wellbore 13. More specifically, during a imaging and calipering session, head 60 rotates circumferentially (azimuthally) as the tool moves upward, creating a helical inspection path within the wellbore 13. In accordance with the present invention, cylindrical tool 16 includes acoustic transducer configuration specifically designed to null reflections from the steel casing 14 and to enhance acoustic reflections received from the cement 12. Head 60 also includes directional sensors therein for recording an azimuth of the head.

Additionally, logging sensors at the surface or on board the logging vehicle record elevation in the well. Digital computer 2 includes means for receiving and processing acoustic waveform signals received from receiving transducers within the acoustic transducer configuration for the purpose of constructing an image which is representative of the structural integrity of the structural layers of interest. Additionally, digital computer 2 includes means for processing acoustic waveform signals for the purpose of calipering thickness of various structural layers within the wellbore. Apparatus 10 also includes memory 6 for storing all sensing data to memory for further analysis or processing. Finally, the logging apparatus includes an image display 4 for viewing an image constructed by the processing functions of the digital computer 2.

Figure 5:
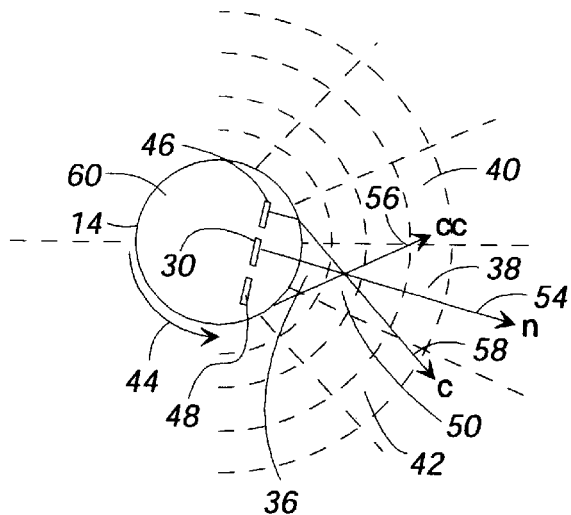
FIG. 5 is a partial cross-section taken along line 3—3 of FIG. 1, illustrating a top view of an alternative embodiment for multiple viewing-position imaging transducer configuration, comprising three pairs of transmitting and receiving transducers, wherein each pair is arranged in the vertically tandem configuration, as disclosed in FIG. 4.

FIG. 5 illustrates circumferential spatial divisions in terms of circumferential sections or voxels centered on a center line of the cylindrical caisling 14. Each transducer includes a planar radiation pattern center. Each of those planes intersect. Depending on the focal area of a particular sensor configuration, the rotating head 60 of the sonde 16 will image each voxel to determine the structural integrity of each material disposed in the wellbore. Generally, the transmitting transducer excitement rate and the angular velocity of the head determine the amount of sensing overlap between adjacent voxels. For example, as angular velocity of the head 60 increases, sensing overlap decreases. The voxel demarcations are useful for describing effectiveness of the inventive transducer configuration, as is explained in greater detail below.

I. Transducer Configuration

Figure 2:
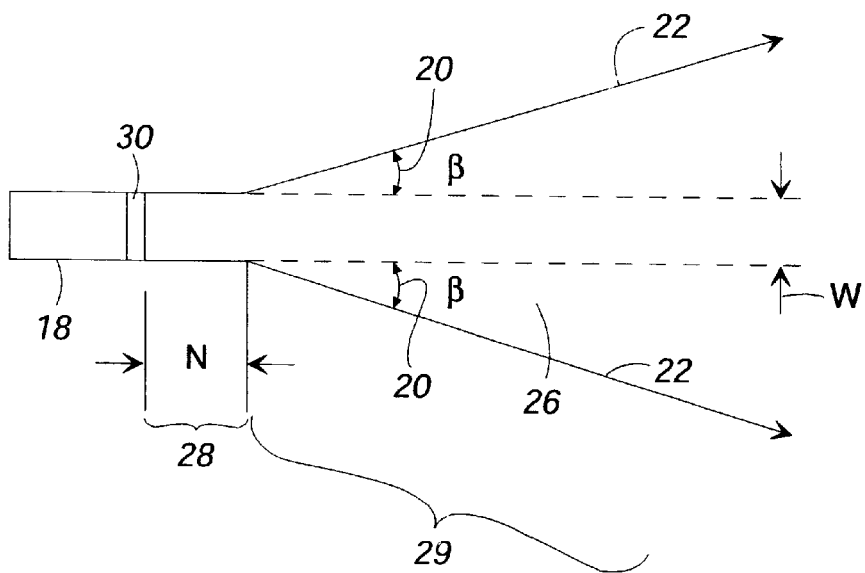
FIG. 2 illustrates an example of a radiation pattern configuration for a rectangular transducer, wherein the beam is collimated in a near field zone and diverges therefrom.

FIG. 2 illustrates a schenili of an example of a radiation pattern for one dimension (width, w, or length, 1) of a rectangular acoustic transducer 30. As seen in FIG. 2, an acoustic beamspread pattern radiating from acoustic scensor 30 includes a collimated field zone 28 which has essentially the same width w as transmitting sensor 30 in a near field zone 28, wherein the near field is defined by a length N. The beamspread pattern diverges beyond near field zone 28 into a transition zone and then into a far field zone. FIG. 2 also illustrates a simplified description of the start of the transition zone 29 by depicting outer peripheries 22 of the start the main lobe 26. Generally, 50% amplitude contours of the radiation pattern for a transducer in a single medium define the outer peripheries 22 of the far field main lobe 26. The other dimension, 1, also has near field, transition and far field zones, but the zone distances depend on length/wavelength. The sensor may include a backing 18 for facilitating propagation of acoustic waves in the desired directions. More specifically, a beamspread angle 20, illustrates an amplitude contour of the beam in the transition zone 29. In the true far field of a radiation pattern, a null angle or contour having zero amplitude lies at the contiguous edges of the main lobe and the first side lobe and is greater than angle 20. Therefore, for purposes of clear illustration, and as further explained below, the null contour falls outside the 50% amplitude contour.

Figure 3:
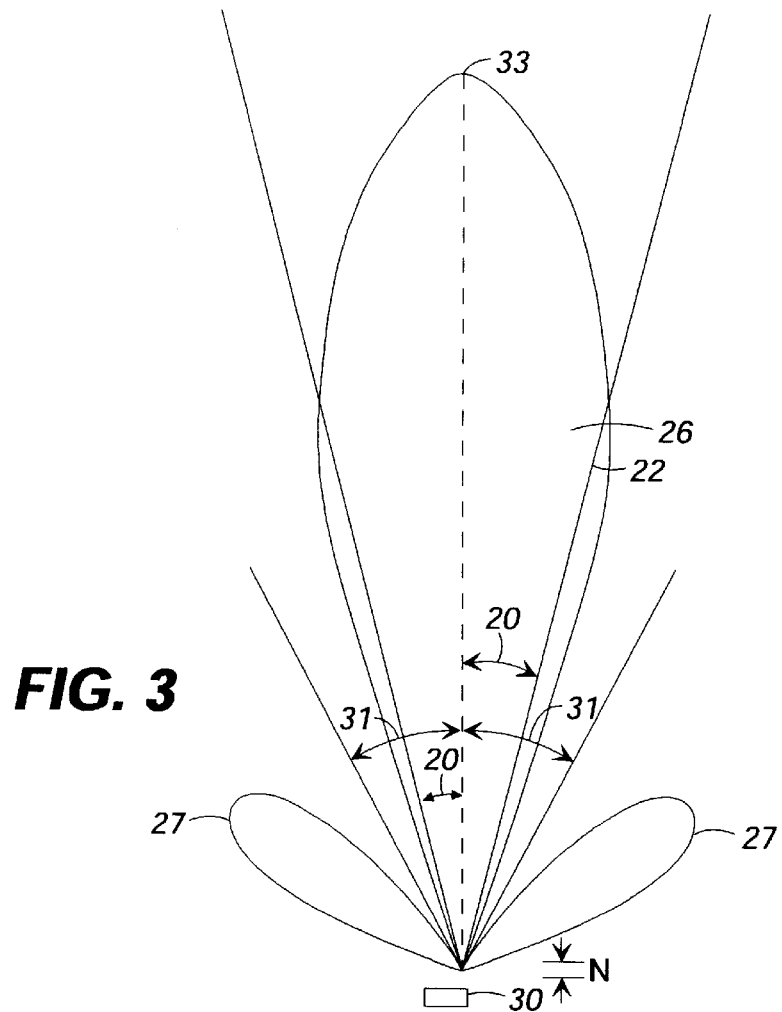
FIG. 3 illustrates the radiation pattern configuration for the rectangular transducer of FIG. 2, further illustrating the radiation pattern in the far field.

FIG. 3 provides an illustration ot the radiation pattern for transducer 30 in the true far field, wherein the far field is defined by distances from the transducer 30 of greater than 10N, where N is the near field distance, as illustrated in FIG. 2. As discussed above, the radiation pattern comprises the main lobe 26 having outer peripheries 22 defined by 50% amplitude contours, which diverge from the collimated zone at an angle 20, defined as the beam spread angle. A center portion of the main lobe 26 is also defined by a 100% amplitude contour 33. Finally. the radiation pattern may include sides lobes 27 diverging from the main lobe 26 outside of a null angle 31. The number of side lobes depends on the ratio of the transducer width/wavelength.

Figure 4:
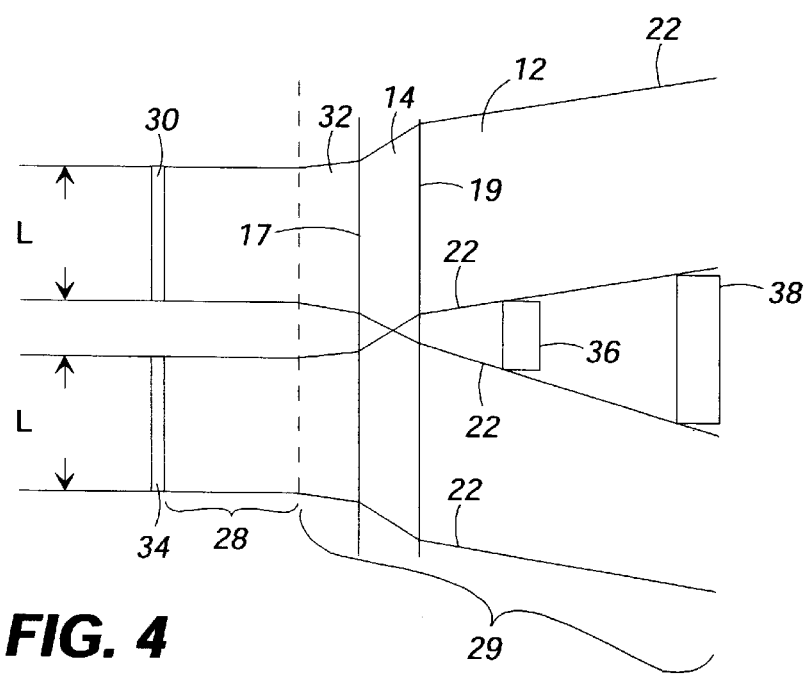
FIG. 4 is a partial section taken along line 2—2 of FIG. 1, illustrating an example of a radiation pattern configuration for rectangular vertically tandem transmitter and receiver transducers with overlapping main lobes selected to enhance voxels in cement while reducing casing reverberation reception.

FIG. 4 illustrates a sectional side view in an axial plane of a configuration for transmitting transducer 30 and a receiving transducer 34 which are adapted to image cement 12 behind casing 14. As is illustrated schematically in FIG. 4, the present invention configures transmitting and receiving transducers 30 and 34 to create overlapping main lobes selected to enhance acoustic signals received from reflectors in the cement 12 as compared to reverberation signals received from voxels in the casing 14. As explained above, outer peripheries 22 of the beams represent 50% amplitude contours. In addition to multiple layers of structural materials within the borehole, various fluids 13 within the wellbore may include drilling fluid 32, as illustrated in FIG. 4 between the transducers 30 and 34 and casing 14.

FIG. 4 also illustrates near and far voxels 36 and 38, respectively within the cement 12. Near voxel 36 includes a smaller area than far voxel 38 because of acoustic beamspread divergence. The present invention utilizes those beamspread patterns to accomplish purposes of the invention. A near surface 17 of the casing 14 nearest the transducers is in a "gap" defined by a non-overlapping zone between the beamspread peripheries 22. More distant from the sensor configuration, far surface 19 of the casing 14 includes a slight overlapping of the beamspread peripheries. Here it is important to note that this slight overlap creates a much smaller acoustic reverberation reflection attributable to the casing 14 as compared to a large peripheral edge overlap at the casing 14.

Generally speaking, apertures which house the transmitting and receiving transducers shape the main lobe 26 to create the above-referenced overlapping effect. That approach selects sizes of the transmitter and receiver to produce overlapping radiation patterns in the region behind the reflective layer and non-overlapping radiation patterns in the vicinity of the reflective layer. The present invention is therefore adapted to control the angular widths of the radiation patterns and the steering directions of the centers of the radiation patterns to achieve overlapping in structural layers of interest. The invention includes overlapping of the near field collimated zones behind but not in the reflective layer. The near field configuration, however, requires greater alignment precision than the far field configuration.

For example, with reference to FIG. 4, transmitting transducer 30 sends energy through a first medium comprising fluid in the borehole disposed between the sonde 16 and the casing 14. In many cases the first medium may comprise drilling fluid 32. The transmitted acoustic energy propagates through the first medium and into a second medium having a highly contrasting acoustic impedance with respect to the first medium. In this case, the second medium may comprise steel casing 14. Thereafter, the transmitted acoustic energy propagates further yet into a third medium, which, in the present case, has an acoustic impedance which is less that that of the second medium. For example, the third medium may comprise cement 12. Receiving transducer 34 receives echoes from reflectors in the third medium.

Since the second medium has a very high acoustic impedance with respect to the first and third mediums, the second medium (steel casing 14) causes high energy reverberations which, prior to the present invention, have masked reflections from reflectors in the third medium (cement). However, the transducer configuration of the present invention aims radiation patterns so that second medium echoes occur between collimated transmitter and receiver patterns in the near field. This configuration improves the ratio of third medium reflector signal to reverberation noise.

FIG. 5 schematically illustrates an alternative embodiment of the present invention which utilizes three pairs of transmitting and receiving transducers. In this embodiment, the sonde head 60 rotates in a counterclockwise direction, shown by arrow 44, as the wireline 8 moves the sonde 16 in a vertical direction within the casing 14 to accomplish complete imaging of the well system. FIG. 5 also illustrates in dashed lines a number of voxels surrounding the sonde 16 which lie within drilling fluid 32, casing 14 and cement 12 for the purpose of defining the location of intersecting beamspread patterns from various transducer pairs. More specifically, sonde 16 includes counterclockwise angle beam transmitting transducer 48 and a corresponding receiving transmitter disposed axially thereunder (not shown), transmitting transducer 30 and a corresponding receiving transmitter disposed axially thereunder (not shown) and clockwise angle beam transmitting transducer 46 and a corresponding receiving transmitter disposed axially thereunder (not shown).

Each of transmitting transducers 48, 30 and 46 fire in sequence, beginning with transducer 48 and ending with transducer 46. As seen from FIG. 5, transducer 48 transmits counterclockwise beam 56 in a direction of counterclockwise far voxel 40, transducer 30 transmits normal beam 54 in a direction of normal far voxel 38, and transducer 46 transmits clockwise beam 58 in a direction of clockwise far voxel 42. Each of beams 54, 56, and 58 intersect within the intersection voxel 50. If a reflector surface exists in intersection voxel 50, the beam having the largest reflection will have an orientation closest to being perpendicular to the reflector surface. The radial distance to the intersection voxel 50 is unchanged as the beam direction rotates. Voxels at other radial distances are also interrogated by all three pairs but at different azimuthal orientations of the rotating head. Waveforms are stored in memory and compared to select the orientation of reflector surfaces in each voxel. Additionally, angular velocity of the sonde head 60 controls the number of firings per voxel. Obviously, firings per voxel increases with decreasing angular velocity. As the number of firings per voxel increases, the clarity of any image constructed from received acoustic energy increases. An image is formed by mapping most probable reflector surface orientations for voxels having strong reflector signals. The mapping requires storing data to select surface orientations for voxels at smaller or larger radial distances than the radial distance of the intersection voxel.

Figure 6:
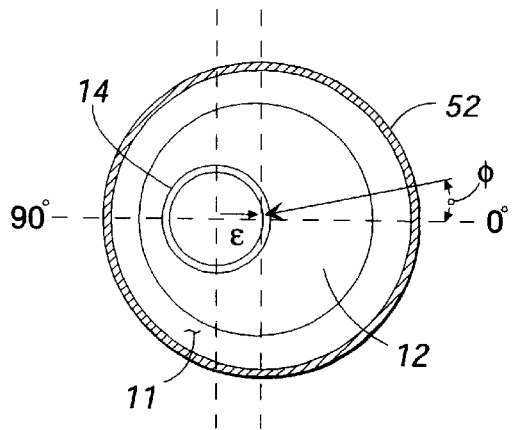
FIG. 6 is a sectional view of a test wellbore configuration including a central casing and a cement annulus surrounding and supporting the casing.

FIG. 6 illustrates laboratory test borehole simulation for validating the engineering design of the inventive transducer configuration. The laboratory version of the system places transducers in specimens containing the essential features encountered downhole. More specifically, FIG. 6 illustrates a top, sectional view of a model specimen which includes casing 14 having a fluid (water) disposed therein. The model also includes a cement annulus 12, an artificial earth formation 11 comprised of sand and epoxy and an outer casing jacket 52. Cement annulus 12 is comprised of a Class H cement cured at 200 psi pressure. The 0° arrow shows the circumferential location of a casing where scanning begins for the imaging process.

Figure 7:
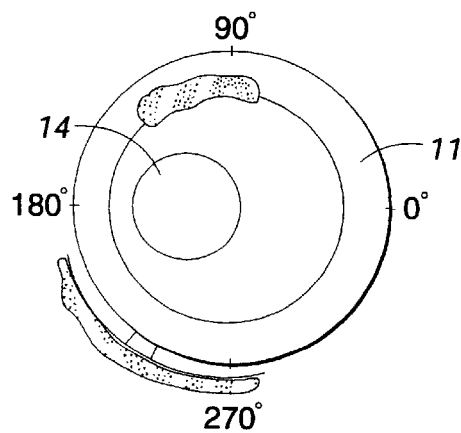
FIG. 7 illustrates an image formed from the information acquired by the transducer configuration of the present invention, wherein darker portions of the image represent stronger reflections from the structural material under examination.

FIG. 7 illustrates an image of specimen having casing eccentered relative to the cement to formation wall. The specimen shown in FIG. 6 was inspected by placing three pairs of transducers within casing 14, wherein the transducers are arranged into the configuration embodiment illustrated schematically in FIG. 5. The boundary of formationto-outer steel casing is also shown. Darker images show stronger reflections. The gray-scale image coinciding with the circle showing the location of the cement-to-formation boundary shows that the method can detect a weakly reflecting surface.

Figure 8:
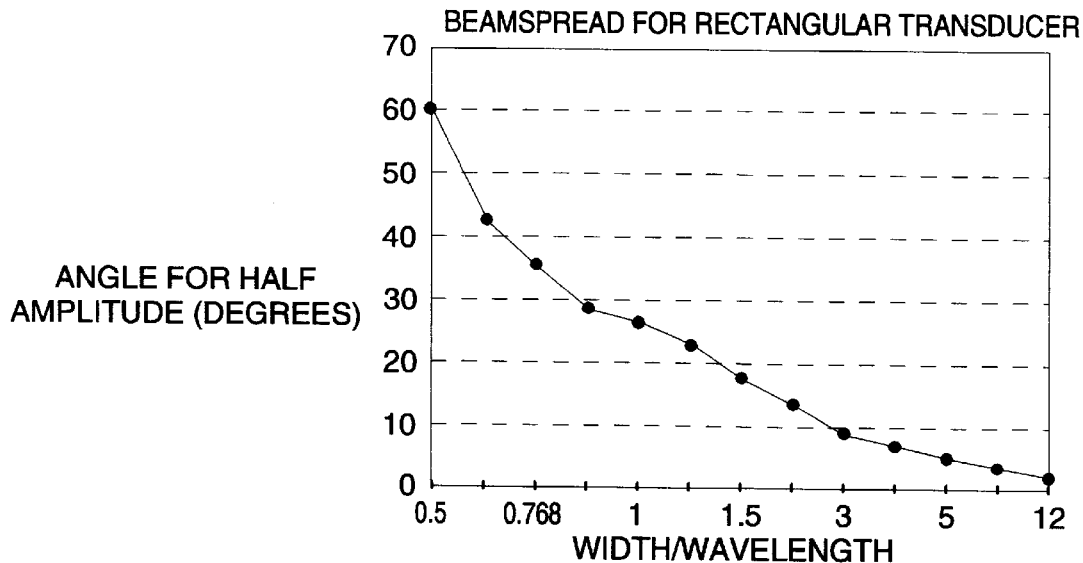
FIG. 8 shows beamspread angle (half-amplitude for pulse-echo) as a function of the aperture parameter, wherein the aperture parameter is expressed as the ratio of transducer width to pulse wavelength.

FIG. 8 shows beamspread angle (half-amplitude for pulse-echo) as a function of the dimensionless aperture parameter, which is a transducer width to acoustic energy wavelength ratio (Width/Wavelength). For the purposes of the present invention, the width may be the narrow or long dimension of the rectangle.

Theoretically speaking, reflectivities and transmissions for normal incidence through a boundary are derived from the acoustic impedance, Z, given by equation (1)

$$Z_i = \rho_i V_i \quad (1)$$

where $\rho_i$ is the density and $V_i$ is the speed of sound for medium i. The reflected amplitude from the boundary is $$R = \frac{(Z_2 - Z_1)}{(Z_1 + Z_2)} \quad (2)$$

The transmitted amplitude (T) is $$T = \frac{(2 * Z_2)}{(Z_1 + Z_2)} \quad (3)$$

Conservation of momentum gives $$T = R + 1 \quad (4)$$

Although equations 1 to 4 over-simplify wave propagation from medium to medium, computer acoustics models may use mathematical relations that account for effects of surface curvature, refraction, attenuation and multimode propagation. With regard to the test specimen illustrated in FIG. 6, the acoustic impedance $Z_i$ of cement is 6.0 MRayls and the $Z_2$ of the simulated earth formation is 4.4 MRayls, which yields a reflected amplitude R of approximately 0.2. With regard to the above-referenced test specimen, experimentally observed reflected amplitudes R matched the calculated values, thus validating the engineering design.

With the inventive acoustic sensor configuration described herein, weak acoustic reflections attributable to the cement 12 are expressed as the images illustrated in FIG. 7. Without the inventive sensor array, reflections from the cement-formation boundary were comparable to the reverberation noise and could not be imaged.

FIG. 8 shows beamspread angle expressed in terms of half-amplitude for a pulse-echo sensor configuration, as function of the aperture parameter, which is the ratio of the transducer width, W, to the acoustic energy wavelength. Width, W, may be the narrow or long dimension of the rectangle. The wavelength, $\lambda$, is obtained from $$\lambda = \frac{V_i}{f} \quad (5)$$

With regard to equation 5, the speed of sound, $V_i$, refers to propagation velocity for acoustic mode i. Frequency $f$, refers to the center of the frequency bandpass. Beamspread angle, $\beta$, shown in FIG. 2, depends on the definition of half amplitude. Received signals from pulse-echo (or other two-way propagation methods having equivalent transmitter and receiver), have half amplitude angle given in FIG. 8. A different definition may apply to one-way propagation. At angle, $\beta$, the magnitude of the signal, A, (for one-way propagation) is $$A = \frac{\operatorname{Sin}(u)}{u} \quad (6)$$

The nondimensional parameter, u, is expressed as $$u = \frac{\pi w}{\lambda} \sin(\beta) \quad (7)$$

Equation 6 applies to the beamspread of rectangular transducers with the width w as shown in FIG. 2. For two way propagation (i.e., pulse-echo), the received signal from a reflector at angle, $\beta$, is reduced by the magnitude A for transmission and again by A for reception. The two-way reduction at $\beta$ compared to the straight-ahead ray is therefore $A^2$. As discussed above, FIG. 8 applies to half-amplitude pulse-echo signals, i.e., to $A^2 = 0.5$. For pulse-echo signals, Equations 6 and 7 are solved using $A = (0.5)^{(0.5)}$. The near-field distance, N, which is illustrated in FIG. 2 is approximated by $$N = \frac{w^2}{4 * \lambda} \quad (8)$$

The aperture designs using Equations 5 to 8 include other orientations of the transducer faces than the vertical orientations shown in FIG. 4. For example, tilting the faces of the transducers in FIG. 4 changes the location of the overlap zone of the transducers. In the experiments to create the image illustrated in FIG. 7, the transducer faces were tilted approximately 4° toward each other in the axial plane. This tilt angle is needed when the gap between the transmitter and receiver becomes large and reduces the overlap at the near voxel.

In a preferred embodiment of the inventive acoustic sensor configuration, and where imaging typical casings having typical sizes in the field, the configuration uses transducers of similar frequency of approximately 400 kHz. Additionally, the preferred embodiment utilizes transducers having a bandwidth of approximately 400 kHz and a size of approximately 1.0 inch by 0.4 inches. Those parameters are comparable to transducers used in pulse-echo cement bond tools. Such transducers are built to withstand downhole temperatures of at least 350° F. and pressures of up to 20,000 pounds per square inch (psi). Normally, the transducers are mounted on a rotating head similar to that of a conventional pulse-echo tool. The head requires accurate mounting angles and centralization in the bore of the casing to assure that the radiation patterns propagate in the required directions with the required standoff from casing.

The tool for the new technique will require sufficient slip-ring connections from each transducer element to the electronics in the stationary part of the tool. The system may also utilize downhole processing, such as data compression, or a sufficient telemetry data rate to transmit information to the surface which is representative of images of the cement behind casing. The transducer azimuth and elevation in the wellbore must be measured to create images as a function of depth in the well.

As discussed above, the invention also relates to a method for selecting transducer apertures to obtain radiation patterns that overlap in the zone of interest but not in the reflective layer which causes reverberation. Aperture modeling in accordance with the present invention traces borders on collimated and divergent edges of transducer radiation patterns. The inventive method offers simplified analysis for sizing transducer faces to select beam shape and angle. The aperture model estimates collimation and divergence of beams passing from transmitter through borehole fluid, casing and cement and returning to the receiver.

II. Image Data Processing

Figure 9:
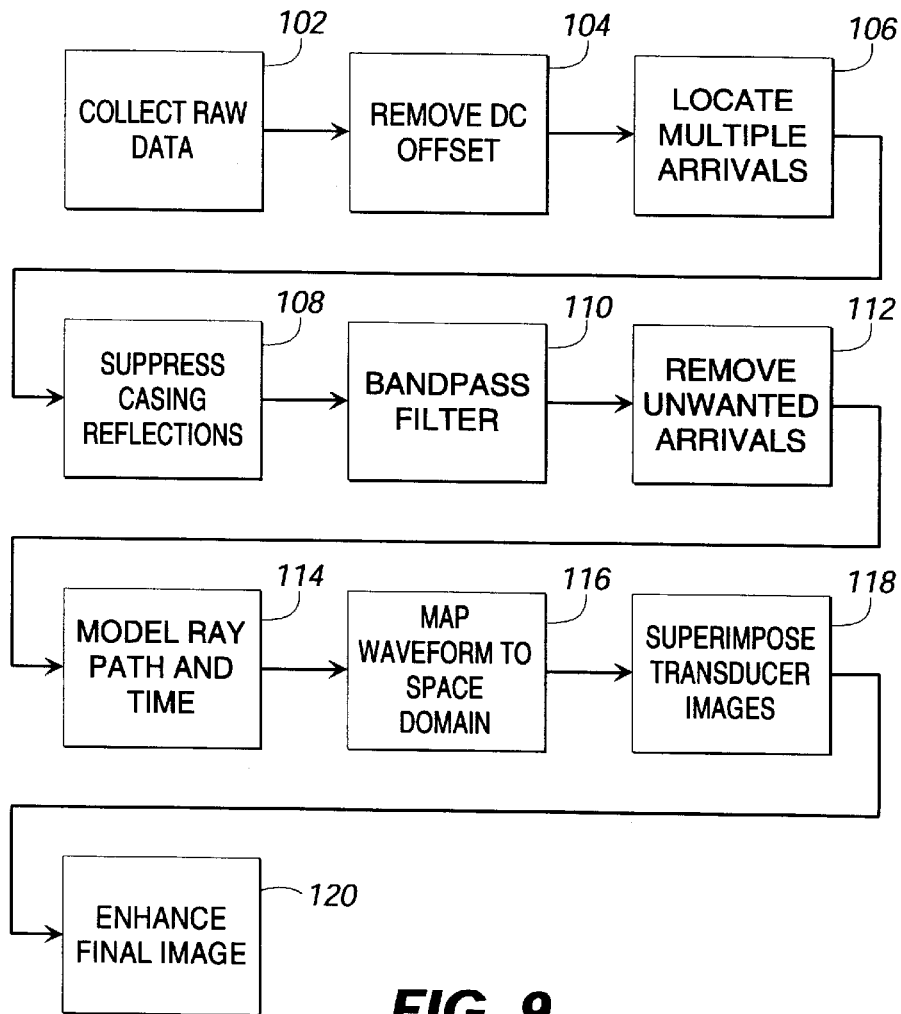
FIG. 9 illustrates a block diagram of the algorithm of the processing sequence for imaging behind reflective layers in accordance with the present invention.

The present invention also provides a unique system and method which improves data processing from the receiving transducers 34 to form images of cement behind casing as illustrated schematically in FIGS. 1 and 9. More specifically, a data processing procedure in accordance with the present invention may utilize a digital computer 2 in combination with unique sonde hardware to process receiving transducer data downhole, compress transducer data for uphole telemetry over wireline 8, reconstruct transducer data image transducer data over display 4, and store image data to memory 6.

The present invention also optimizes downhole data processing for telemetry on existing wireline systems that transfer information from the wellbore 13 to hardware on the surface. The downhole processing performs transformations that extract useful information from waveforms and reject unwanted reverberations attributable to the casing fluid (e.g., drilling fluid 32) and the casing wall (e.g. steel casing 14). A data interpretation algorithm in accordance with the present invention utilizes unique processing methods for selecting the most reflective surface locations and orientations in the media (e.g., cement 12) behind the reflective layer (e.g. steel casing 14).

The approach uses processing algorithms on data from multiple transducers to image behind reflective layers, which requires several steps to create images from data produced by receiving transducers 34, since signals from reflectors behind a strongly reflective layer are difficult to detect. More specifically, impedance mismatches at layer boundaries give weak reflector signals as compared to reverberations, because reverberations occur between the transducer and the first reflector (casing 14). FIG. 9 illustrates a flowchart of the algorithm of the processing sequence for imaging behind reflective layers in accordance with the present invention. As discussed in greater detail below, receiving transducers 34 collect raw data from azimuthal observations, as indicated by module 102. The inventive system then removes any DC offset from the received signals as indicated in module 104. The system then locates multiple arrivals in the data signal, as indicated in module 106, and suppresses multiple arrivals stemming from casing reflections, as indicated in module 108. The system then subjects the processed signal to a bandpass filter for further noise reduction, and removes all unwanted arrivals, as indicated in modules 110 and 112, respectively. The system then models acoustic ray paths with respect to time for receiving transducer, as indicated in module 114. The system then transforms the time domain waveform amplitude to the space domain based on ray path calculations, as indicated in module 116. The system then superimposes images created from each of the receiving transducers and enhances the final image, as indicated in modules 118 and 120, respectively.

As discussed above, the invention includes a method for processing data to obtain images of reflectors behind a highly reflective layer which causes reverberation. The processing includes four features needed for creating images successfully with conventional wireline surface trucks and telemetry: A) enhancement of downhole signals behind the reflective layer: B) adaptive downhole data compression for telemetry; C) calculation of probable reflective surface location and orientation behind the reflective layer; and D) techniques for forming images from the data transmitted to the surface.

A. Enhancing Signals From Behind Reflective Layers

Detecting signals behind the reflective casing layer requires the discrimination between signals reverberating from the steel casing 14 and reflections associated with the less reflective structural layers behind the casing 14. In this context, first arrival detection is critical to imaging reflective surfaces behind the casing 14, because it facilitates the removal of unwanted reverberations from the ray path signal.

1. First and Multiple Arrival Detection

Figure 10:
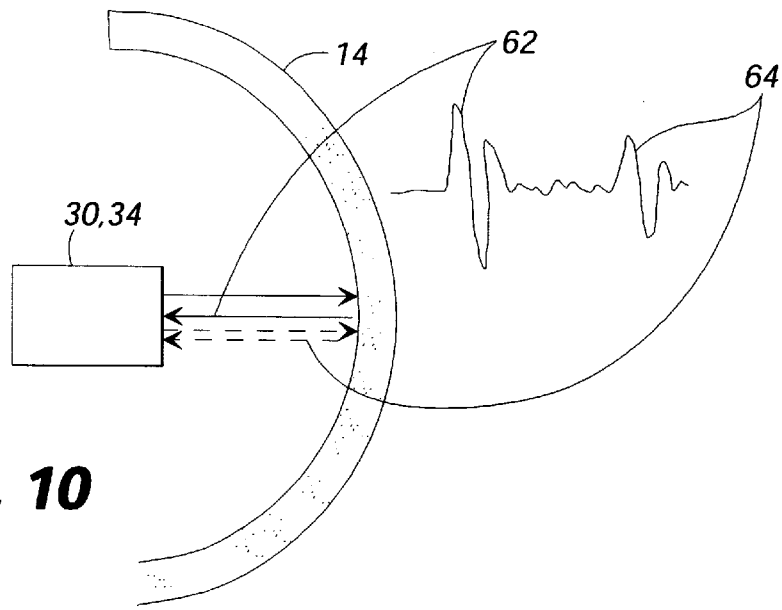
FIG. 10 illustrates multiples of reverberations subsequent to first a acoustic reflection arrival.

FIG. 10 illustrates multiples of reverberations subsequent to first a acoustic reflection arrival. The transmitting and receiving transducers 30 and 34 are illustrated schematically within casing 14 for the purposes of a functional discussion of the inventive system. Reference numeral 62 indicates the first pulse and reflection of an acoustic signal sent by transmitting transducer 30, and also indicates the first reflection signal strength as a function of time. In the signal strength versus time plot, the first reflection signal includes a peak amplitude for a given transmitting transducer pulse, which is also indicated by the numeral 62. Numeral 64 illustrates the second reflected signal as shown in dashed lines as a reverberation of the first pulse from the transmitting transducer surface, to an inside surface of the casing 14, and back to receiving transducer 34. The second reflection occurs because of trapped reverberations in the fluid inside the casing. As expected, the peak of the second reflection is less than that of the first reflection, which is due to acoustic energy dissipation associated with the surrounding materials and fluids.

The inventive system calculates the first arrival time by using the peak of the envelope of the signal and a searching mechanism to identify threshold values. As discussed in greater detail below, the inventive system utilizes the first arrival time of the peak of the envelope to effectively suppress unwanted reflection signals. The ring-down time of the first arrival depends on transducer reverberations and casing reverberations. As illustrated in FIG. 10, after first arrival detection, other multiples are identified. The arrival times of the later arrivals are integer multiple of the first arrival time.

2. Suppressing the Multiples

Figure 11:
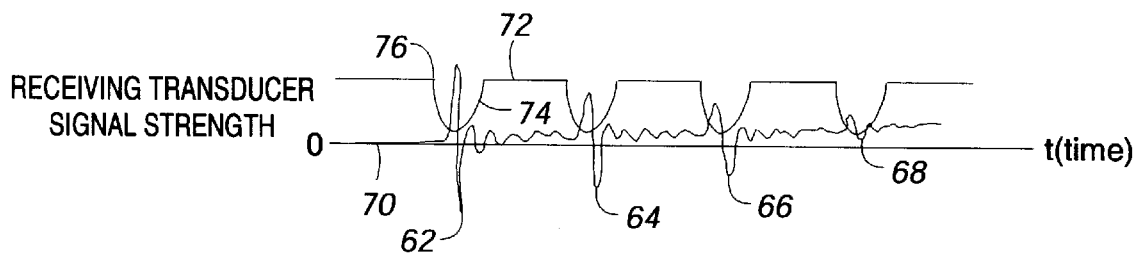
FIG. 11 illustrates a time domain adaptive multiplier signal which suppresses undesired reflection reverberations.

FIG. 11 illustrates a time domain adaptive multiplier signal which, when multiplied by the processed output of receiving transducers 34, suppresses undesired reflection reverberations. FIG. 11 also illustrates the acoustic reflection signal strength as a function of time, in a manner which is similar to that of FIG. 10, but in illustrated greater detail. As seen from the reflection signal, numerals 62, 64, 66 and 68 each represent first , second, third and fourth reflections, respectively, from a single pulse originating from transmitting transducer 30. As discussed above, casing 14 produces the primary and multiple reflected signals 62 through 68, which are considered to be noise.

The inventive system utilizes several techniques suppressing those signals: 1) Detection of casing reflections using techniques described above; and 2) suppression of those reverberations via the use of a suppressing signal 72 based on first reflection arrival time and peak signal strength illustrated by numeral 62. FIG. 11 illustrates suppression of these reverberations with an adaptive multiplier based on the detection algorithm. The valley 74 in the multiplier has a width which is selected from the reverberation time observed for the first reflection. This width depends strongly on reverberation time for the particular casing. The location of the starting edge 76 of each valley in time is calculated as a multiple of the first arrival time of the first reflection. Thus, the system may multiply suppressing signal 72 and reflection signal 70 to eliminate reflection signals 62, 64, 66 and 68, thereby reducing noise associated with the reflective layer (casing 14) and facilitating the detection of signals associated with occlusions in layers of material (e.g., cement 12) behind the reflective layer (casing 14).

3. Frequency filtering

As discussed above, acoustic impedance mismatches of casing fluid, casing and the material behind the greatly reduce energy transmitted behind the reflective layer represented by the casing. For example, the casing 14, which has a high acoustic impedance, borders cement 12. Thus, much of the acoustic signal generated by transmitting transducers 30 is reflected at casing boundaries. In accordance with the present invention, the desired effect is to have receiving transducers 34 receive broadband signals, since the broadband signals include pertinent information about reflectors (e.g. occlusions or unwanted channels in cement 12) behind casing concentrated in a narrow bandwidth determined by the thickness resonance of the casing. The inventive system then extracts the narrow bandwidth information from the received broadband signal utilizing a bandpass filter. Processing observed waveforms with a bandpass filter enhances reflector signal to reverberation noise. Useable frequencies are typically approximately equal to the thickness resonance frequency of the casing wall. Thickness resonance of such frequencies are typically 250 kHz to 600 kHz.

4. Identifying Different Arrivals

Proper identification of different arrivals (compression, shear, and multiples) is a key factor in creating images. Without proper identification, different arrivals may cause incorrect image reconstruction for the region behind the casing. A single transducer response does not uniquely define different arrivals. Therefore, the inventive system utilizes multiple transducer responses to identify arrivals for valid imaging behind casing.

5. Cross-Referencing the Different Transducers

The multiple viewing position technique has each transducer pair response identify different aspects of wave propagation behind casing. For example, FIG. 5 illustrates a top view of three pairs of transmitting and receiving transducers. The center transducer pair produces large casing reverberations while the off-centered transducer pairs have smaller casing reverberations due to large refracted angles in the casing. These features are used to identify different objects by cross referencing the different transducer responses, as explained in greater detail below.

B. Adaptive Data Transmission

Imaging behind casing requires transmitting large amounts of data uphole. Present telemetry systems have inadequate bandwidth to transmit full waveform data at commercial logging speeds. After signal enhancement by bandpass filtering, the inventive system employs adaptive downhole data compression techniques based on signal characteristics. One of the following three approaches is selected based on waveform characteristics for a particular borehole.

1. Simplified Time Window Summation

Here, each waveform is divided into small number of time windows for independent summing within each time window. Time window lengths depend on voxel size in the space domain and the speed of propagation of acoustic energy through the medium behind casing. Each time window data point represents the contribution of signals from the corresponding voxel. Image resolution in the propagation direction depends on the time window duration. Image resolution in the azimuthal direction depends on the width of the transducer radiation pattern, the distance behind casing and the sampling rate (see FIG. 5).

2. Dominant Frequencies

To send waveforms to the surface, the system may employ techniques to reject unnecessary frequency information. Such rejection is possible because information about reflectors behind the reflective layer (e.g., casing 14) exists within a narrow frequency band. As discussed in greater detail below, the system may perform a Fourier Transform on the broadband signal and select only those signals contained within the narrow band of interest. Because only a band of the Fourier components is sent, the system effectively compresses the waveform. The system then reconstructs a close replica of the waveform by zero padding Fourier components and performing an inverse Fourier transform.

3. Wavelet Transform of Full Scan Waveforms as a Pattern

The inventive system employs other means of compressing the signal of interest for uphole telemetry, by utilizing waveform characteristics associated with adjacent voxels in the wellbore. Typically, adjacent voxels in an azimuthal direction of the wellbore 13 will have similar waveforms. This similarity can be used to perform wavelet data compression techniques. For example, coefficients of a wavelet transform represent key contributions to the signal. For band limited signals, only a few wavelet coefficients are needed to reconstruct the waveform above ground, after uphole telemetry. Therefore, selecting only a small number of wavelet coefficients for uphole telemetry effectively compresses the signal for uphole processing. As explained above, imaging behind casing requires multiple observations at different azimuths. Those observations form a data plane having orthogonal coordinates of time and azimuthal position. The waveforms comprising this data plane have a distinctive pattern which the inventive system converts using a wavelet transform having a relatively small number of coefficients. After uphole telemetry, the inventive system then reconstructs the data plane using an inverse wavelet transform.

C. Adaptive Voxel Configurations

The collection of data downhole must give the desired coverage of the volume region behind casing for the system to construct a useful image. For some applications, overlapping in the azimuthal and axial direction is desired. Frequently, imaging systems must utilize overlapping voxels in the azimuthal direction to assure the detection of occlusions or channels which form from the migration of gas vertically through freshly poured cement in a direction opposite to that of the force of gravity. However, the system may adequately use non-overlapping voxels in the axial direction to assure channel connectivity in the axial direction. For example, FIG. 5 shows voxels touching in the azimuthal direction to give 100% coverage. Furthermore, FIG. 4 shows the different sizes of the near and far voxels in the axial direction. For 100% coverage in the axial direction, the near voxels must contact which causes the overlapping of the far voxels.

Figure 12:
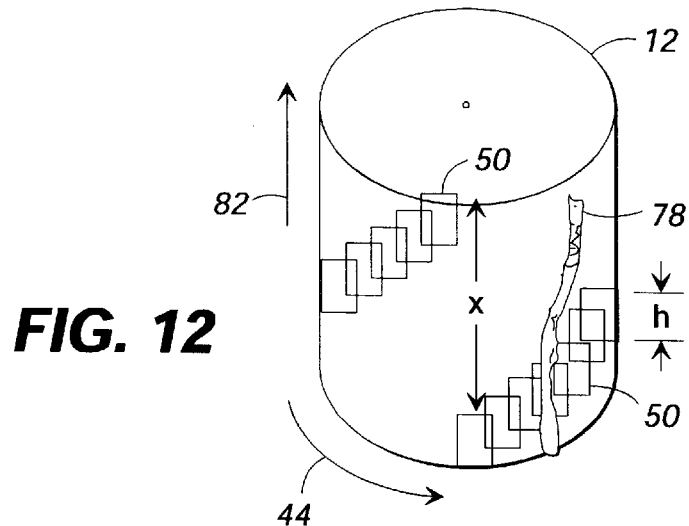
FIG. 12 illustrates an example of a data collection technique in accordance with the present invention wherein consistent voxel configurations overlap in the azimuthal direction but do not overlap in the axial direction.

FIG. 12 illustrates an extreme example of overlapping voxels in the azimuthal direction, as illustrated by arrow 44, and non-overlapping voxels in the axial direction, as indicated by arrow 82. The azimuthal overlap assures detection of an elongated channel 78 during each complete rotation. In this example, channel axial continuity is evaluated only once per pitch. The faster the logging speed, the greater the pitch. The azimuthal overlap is determined by the rotational speed of the rotating sonde head 60 and the pulse rate of the transmitting transducers 30, 46 and 48

For non-overlapping voxels in the axial direction, voxels form a helical spiral. To avoid axial overlap, the pitch of the helix is selected to exceed the largest axial size of any voxel. The intersection voxel 50 in FIG. 5 is interrogated by transducers 46, 30 and 48 for each given azimuthal position of the head. The objective of having all transducers inspect every voxel is to identify the location and orientation of any reflective boundary which might occur in any voxel. To select which voxels contain reflective surfaces, it is necessary to compare the relative amplitudes observed with each of the multiple viewing position transducers. The voxel corresponding to the first arrival behind casing in the propagation direction identifies the location of a surface reflection. The incidence angle of the transducer with the strongest amplitude signal from the voxel identifies the refracted angle of a reflecting surface within an occlusion or channel within the cement. The refracted angle determines the orientation of the normal to the reflecting surface, thus providing the inventive system with information necessary to construct geometry of occlusions, channels, or defects in the cement-casing interface. Therefore, both timing and amplitude of signals are required to select the probable location and orientation of the occlusion surface.

Unlike intersection voxel 50, near and far voxels 36 and 38 require head rotation to have all transducers inspect a given voxel. The collection of data and the construction of images must have consistent voxel configurations. For a valid probability, all transducers must follow the same helix. If the helix inspected by one transducer is significantly shifted axially from the helix inspected by another transducer, changes in the reflecting surface with axial position may invalidate the measurement.

The inventive system disclosed herein minimizes problems with identifying the location and orientation of surfaces behind casing. The inventive imaging system includes adaptive voxel configurations to meet the needs for each borehole. For any given wellbore, the voxel radial thickness is determined by time window resolution (typically a few wavelengths in cement) in evaluating an output signal of any given receiving transducer.

D. Forming Images

The final step of the inventive data processing algorithm is to create images of surfaces behind the highly reflective layer (casing 14). Since transmission through a highly reflective layer, such as steel casing 14, is weak, the reconstruction of information for reflectors behind casing is an enormous signal enhancement problem. Thus, the inventive system subdivides processing into several stages, as discussed above. Each transducer output is enhanced separately in the time domain and compressed as described above. Transducer responses are combined uphole to form images, as discussed below.

1. Mode Identification

Figure 13:
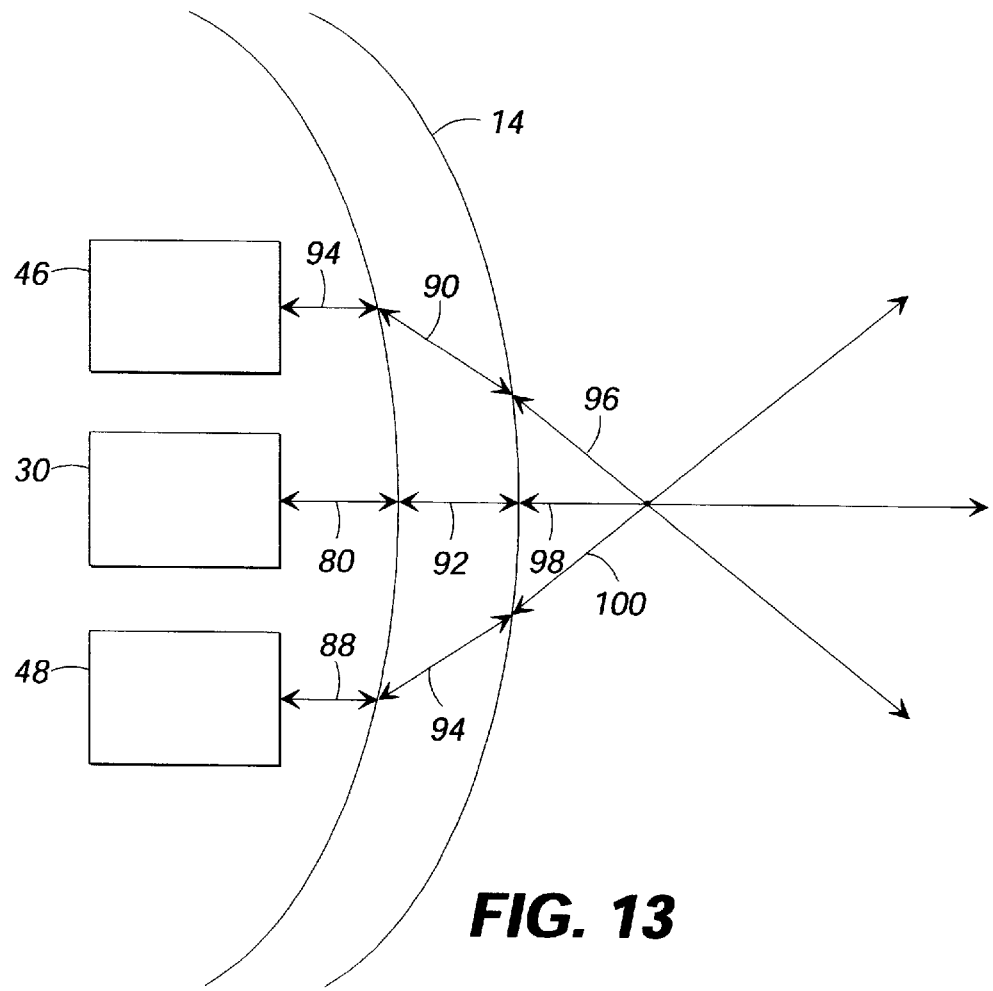
FIG. 13 illustrates a schematic diagrarm of acoustic ray paths emanating from three transmitting transducers, each leaving different image paths in the image plane.

Wave propagation in a solid medium involves different modes (waves propagating at different speeds). For example, acoustic energy generated by transmitting transducers will travel at different speeds, depending upon the material through which the acoustic energy travels. For example, propagation speeds will be different for drilling fluid, steel, and cement and for shear and compressional waves. Proper identification of modes is necessary to transform voxel information uniquely from the time domain to the space domain. The multiple viewing position technique helps to identify modes by using ray tracing to calculate different propagation velocities and azimuthal positions. FIG. 13 schematically illustrates the direction and progression of various acoustic rays which represent the centers of acoustic radiation patterns from transmitting transducers 46, 30 and 48 through the casing 14. The move-out of a reflected signal in time as the transducer rotates azimuthally is a key factor in confirming mode arrivals. The inventive system is configured to process modal information in the imaging algorithm by determining mode speeds that make all transducer processed outputs consistent.

2. Transforming From Time to Space Domain For Individual Transducers

The inventive system incorporates an algorithm which converts the time domain data from the receiving transducers into a crude image in the space domain. This algorithm organizes ray path information for reconstruction by ordering data on transducer and casing position and on propagation velocity behind casing. As illustrated in FIG. 13, transmitting transducers 46, 30 and 48 have different ray paths in a horizontal plane. For example, transmitting transducers 46, 30 and 48, each include ray paths 84, 86 and 88 for interrogating a specific intersection voxel within cement 12 beyond casing 14. Arrows, 96, 98 and 100 represent the propagation of centers of acoustic radiation to and from an occlusion or channel within the cement 12. Arrows 90, 92 and 94 represent refracted propagation of centers of acoustic radiation paths through the steel casing 14 to and from a reflective occlusion within the cement.

In processing the received acoustic signals, time domain amplitude information is transformed to space domain using the wave velocity and the angular orientation of the ray path. The beamspread of the radiation pattern is included by calculating the ray paths for the edges of the radiation pattern. The algorithm treats increasing voxel transverse width with increasing propagation distance. The procedure uses a ray tube concept to spread amplitude information as a function of propagation distance.

3. Adaptive superposition of different transducer contributions

Multiple viewing position transducers 46, 30 and 48 contribute independent radial and azimuthal information about reflectors behind casing. The inventive system utilizes different weighting factors to combine their independent measurements to determine voxel locations that contain reflective surfaces. For example, the transmitting transducer 30 in FIG. 5 receives stronger signals than the offset transducers for reflector surfaces having normals parallel to the radius of casing 14. The inventive system detects reflector surfaces with normals tilted relative to the casing radius by selecting the offset transducers (transducers 46 and 48) with a refraction angle most nearly coinciding with a normal to a reflector surface.

F. Image Enhancing

As discussed above, dense azimuthal coverage is needed for smooth images. For example, the image disclosed in FIG. 7 has 36 azimuthal observations. The inventive system may also include an interpolation grid stored to memory in order to obtain high resolution images. The inventive system utilizes several of such data smoothing techniques, as discussed below.

1. Imaging Smoothing

Image smoothing may be done in two steps. First, reflection wave amplitudes are redistributed in space using ray tube or energy spreading. Here, the system subdivides the tubes to obtain a smaller grid spacing, which effectively increases the number of voxels but the total energy distributed amongst all voxels remains the same. Second, the inventive system smoothes the amplitude using a moving rectangular-image filter.

2. Coherent Enhancement and Suppression

As discussed above, due to reverberations, various arrivals may mask signals from the reflector behind casing. Some reverberations have distinctive patterns. For example, transducer ring-down and casing fluid multiple reverberations could create false images in the map of the region behind casing. These reverberations may have arrival times dependent on azimuthal position. Simple subtraction of reverberations may be insufficient. If subtraction of reverberations is insufficient, coherency analysis on a group of azimuthal observations may be more effective. Using coherency analysis allows the enhancement of images from reflectors (e.g., occlusions or channels) behind casing 14 while suppressing reverberations.

III. Dual Distance Transducers

Figure 14:
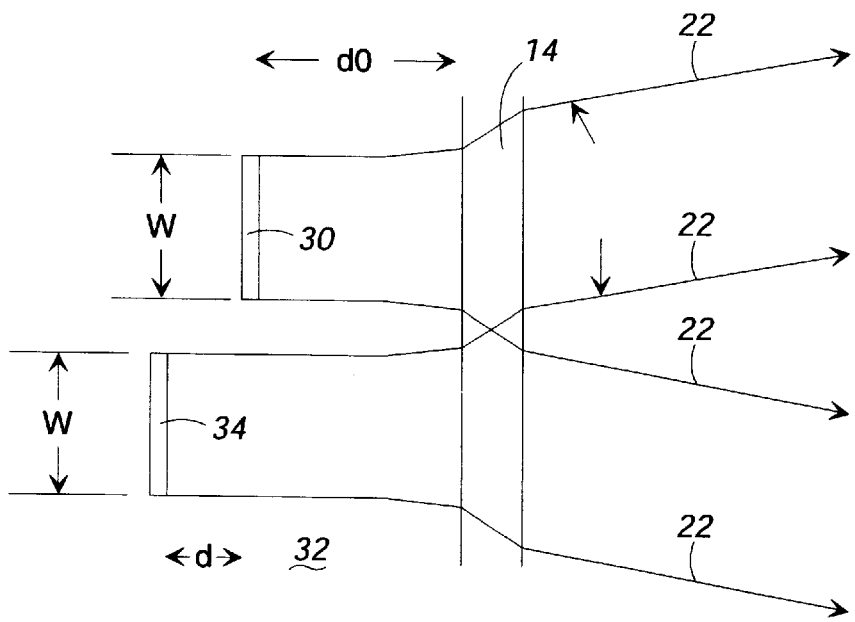
FIG. 14 illustrates a sectional view an example of a radiation pattern configuration for rectangular, vertically tandem transmitter and receiver transducers positioned at dual distances from the sonde geometric center, with overlapping main lobes selected to enhance voxels in cement while reducing casing reverberation reception.

As discussed above, the casing 14 and fluid 32 trap reverberations which can mask echoes from reflectors in the cement 12. An alternative embodiment of the present invention relates to a configuration which places transducers at two distances from the casing. FIG. 14 illustrates in sectional view an example of a radiation pattern configuration for pulse-echo transducers 30 and 34 positioned at dual distances from a geometric center of sonde rotating head 60. For pulse echo, each transducer is operated separately at a different time than the other and senses reflectors anywhere in its radiation pattern. Both transducers detect reflector within overlapping main lobes (region 99) as indicated between the intersecting 50% amplitude contours 22. Different travel times in the fluid 32 between transducer and casing give different interference time of the fluid reverberations.

More specifically, the transducer configuration approach of FIG. 14 selects the fluid path of transducer 34 to have travel time exceeding the travel time of the transducer 30. The extra travel time is chose to be approximately equal to the casing reverberation time. The transducer 34, therefore, has no fluid reverberation during the time interval which is obscured by a first fluid multiple of the first transducer. Likewise, the transducer 30 has minimal reverberation during a first fluid multiple of the second transducer. For each successive time window between fluid multiples, a processor selects the transducer with minimal reverberation. This configuration improves the ratio of third medium (cement 12) reflector echo to reverberation noise.

FIG. 14 shows illustrates different fluid path lengths for transducers 30 and 34. Transducer 30 has path length, d0. Transducer 34 has path length, d+d0. Transducers 30 and 34 are sufficiently axially separated so that one transducer does not insonify (impinge with acoustic energy) the face of the other and thereby receive fluid multiples from the face of the other transducer. In this configuration, transducer 34 must be elevated axially to inspect the same voxels as are inspected by transducer 30. Logging apparatus 10 (shown in FIG. 1) includes processing means in digital computer 2 to compensate for axial elevation differences between transducers by storing waveforms from the two transducers, recalling the waveforms and comparing them at identical elevations within wellbore 13.

Figure 15:
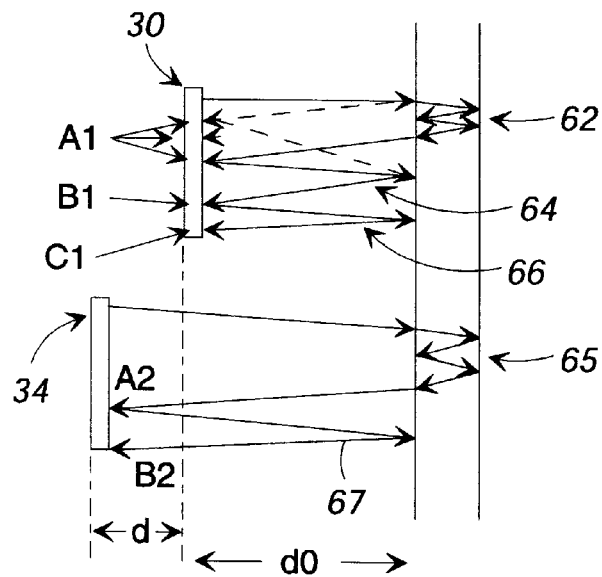
FIG. 15 illustrates the transducer configuration of FIG. 14. schematically representing ray tracing of wave propagation for transducers with two different path lengths in fluid.

FIG. 15 illustrates the transducer configuration of FIG. 14, schematically representing ray tracing of wave propagation for transducers with two different path lengths in fluid. FIG. 15 illustrates the wave propagation as rays instead of beams. The rays travel uninterrupted to the casing. More specifically, FIG. 15 shows a ray from transducer 30 enter casing 14 and reverberate to produce a first reflection or reverberations 62. The rays complete a round trip and return to location A1 on Transducer 30. Similarly, rays from transducer 34 enter casing 14 to produce a first reflection or reverberations 65 and return to location A2 on transducer 34. Rays reflected at locations A1 and A2 by the faces of transducers 30 and 34 generate fluid multiples 64 and 67, respectively. The first fluid multiples make second round trips in fluid 34 (as mentioned, the first round trips return to locations A1 and A2) and return to locations B1 and B2, respectively, for transducers 30 and 34, respectively. The second fluid multiple makes a third round trip 66 in fluid and returns to C1 for transducer 30.

Figure 16:
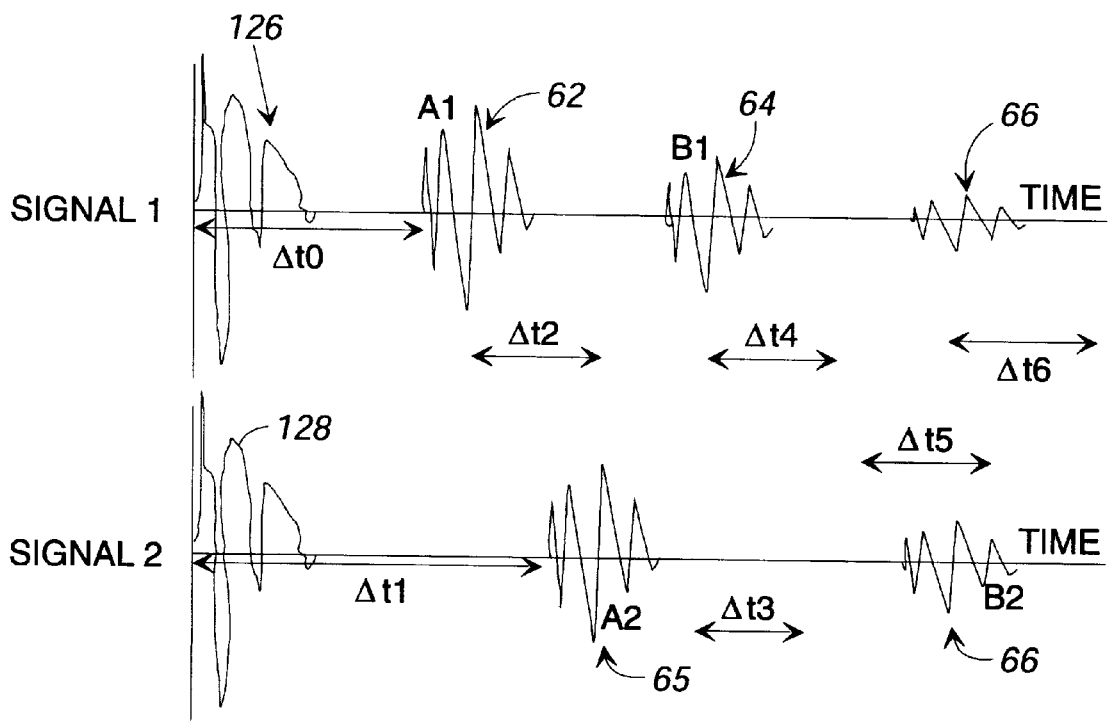
FIG. 16 illustrates the signals obtained for the dual distance transducers shown in FIG. 15.

FIG. 16 illustrates the signals obtained for the dual distance transducers 30 and 34 shown in FIG. 15. The echoes at A1 and A2 arrive at times $\Delta t0$ and $\Delta t1$. The echoes at B1 and B2 arrive at $\Delta t0 + \Delta t2 + \Delta t3$ and $\Delta t1 + \Delta t2 + \Delta t3 + \Delta t4$, respectively. An important feature to note is that the time between A1 and B1 is different than the time between A2 and B2. No fluid multiple occurs for transducer 34 during time window $\Delta t4$. This quiet time interval for signal 2 permits inspection of the cement located behind casing at a radial distance range from x1 to x2 where:

$$x1 = v^*(\Delta t2 + \Delta t3) \quad (9)$$

$$x2 = v^*(\Delta t2 + \Delta t3 + \Delta t4); \text{ and} \quad (10)$$

v=acoustic energy propagation speed in cement.

Similarly, the radial distance range behind casing corresponding to $\Delta t5$ is inspected with transducer 30 via signal 1 because transducer 34 has its first fluid multiple during that time interval.

Figure 17:
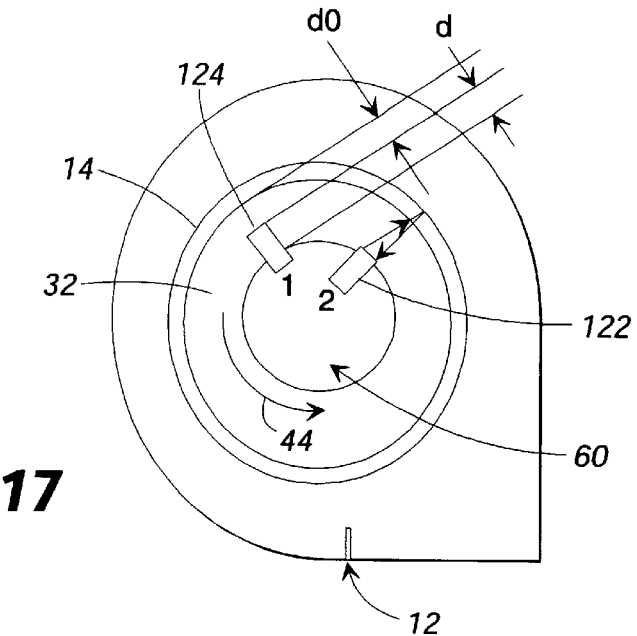
FIG. 17 illustrates an alternative embodiment of the transducer configuration having two transducers embedded in the sonde head at different azimuths in the radial plane.

FIG. 17 illustrates an alternative embodiment of the transducer configuration having two transducers 122 and 124 embedded in the sonde head 60 at different azimuths in the radial plane. The configuration of FIG. 17 is significantly different than that of FIG. 14, but achieves the same result. More specifically in this configuration, transducers 122 and 124 have separate azimuths instead of the separate axial locations shown in FIG. 14. For separate azimuths, the same echoes through fluid 32 from casing 14 and cement 12 occur as illustrated by the waveforms in FIG. 16, and the same calculations for arrival times apply as set for above, taking into account distances d and d0. The digital computer 2 in logging apparatus 10 includes processing hardware and software to compensate for azimuth differences between transducers, by comparing waveforms generated by transducer 122 to those generated by transducer 124, by taking into account the azimuthally desperate locations of transducers 122 and 124, in a manner similar to the process for the transducer configuration of FIG. 14. More specifically, waveforms for identical azimuths can be compared for the two transducers by using stored data in the manner described above.

Figure 18:
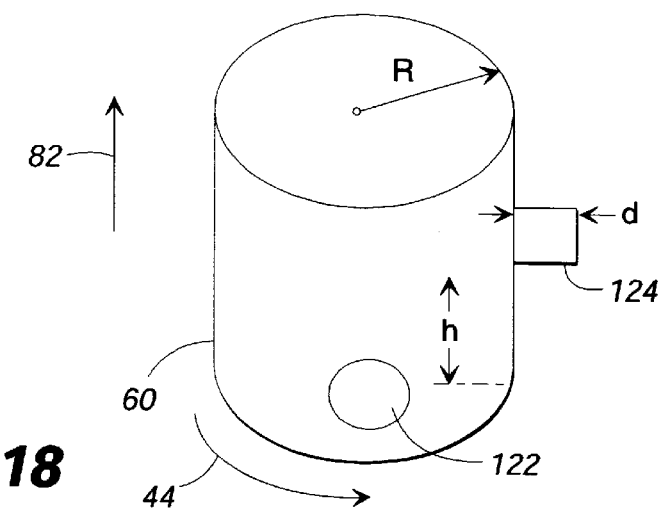
FIG. 18 schematically illustrates vertical and radial distance between two pulse-echo transducers embedded within a sonde head.

FIG. 18 schematically illustrates another embodiment of the inventive transducer configuration which includes vertical, radial and azimuthal separations between two pulse-echo transducers122 and 124 embedded within sonde head 60. By having offsets in the radial, azimuthal and axial directions as shown in FIG. 18, the transducers can log nonoverlapping helical paths. If the logging axial speed and rotational speed are controlled to have an axial translation of distance, h, in the time that the head rotates 90°, then transducers 122 and 124 will insonify exactly the same helical path. The inspection time for transducer 122 will occur later by a fourth of the rotational period. Another advantage of having two transducers is the capability to make a downhole measurement of the fluid speed of sound. The fluid paths of transducers 122 and 124 differ by distance d. Dividing d by the difference in travel times to the inner surface of the casing gives speed of sound of the fluid. This measurement is especially important in oil base drilling fluids having dissolved natural gas. Dissolved gas gives unexpectedly small fluid speeds of sound, which leads to inaccuracy in the calculation of distances in fluid.

Figure 19A:
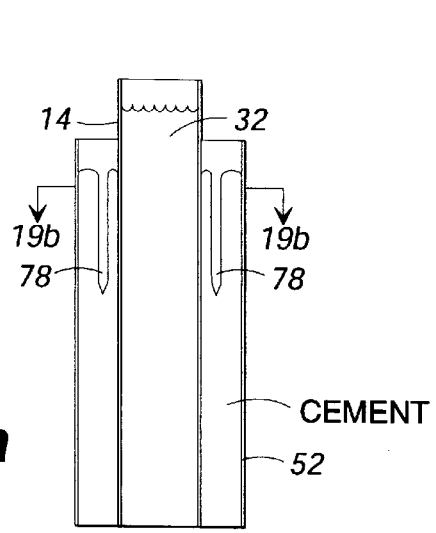
FIG. 19(a) illustrates a sectional side view of a cylindrical test wellbore configuration including a central casing, a cement annulus surrounding and supporting the casing, and several test channels formed in the cement annulus.
Figure 19B:
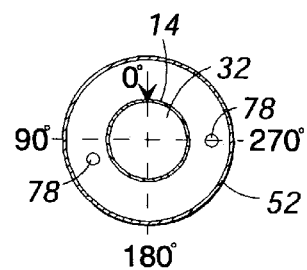
FIG. 19(b) illustrates a section view of the cylindrical test wellbore configuration taken along line 19(b)—19(b) of FIG. 19(a).

FIGS. 19(*a*) and 19(*b*) illustrate a cylindrical test wellbore configuration including a central casing 14, a cement annulus 12 surrounding and supporting the casing, several test channels 78 formed in the cement annulus, and an outer casing 52 (simulated hard formation). This laboratory version includes the essential features encountered downhole. The specimen shown in FIGS. 19(*a*) and 19(*b*) was inspected by placing a pair of transducers inside the inner casing. The echoes resembled those of FIG. 16, except that the baseline signal included noise. For example, the baseline noise in time window, $\Delta t3$, had amplitude approximately one tenth that of the fluid multiples. The echo from reflector in cement was larger than the baseline noise but smaller than the amplitude of the multiples.

As discussed above, the dual distance transducer configuration embodiment utilizes different fluid multiple path distances to provide time windows that are free of fluid reverberations and therefore achieves a good signal to noise ratio for receiving signals from reflectors within cement 12 behind casing 14. If one transducer has fluid reverberations obscuring parts of a first region behind casing, the second transducer has a time window without reverberations for that first region behind casing. If fluid reverberations obscure a second region for the second transducer, the first transducer can have a reverberation free time window for the second region.

Figure 20A:
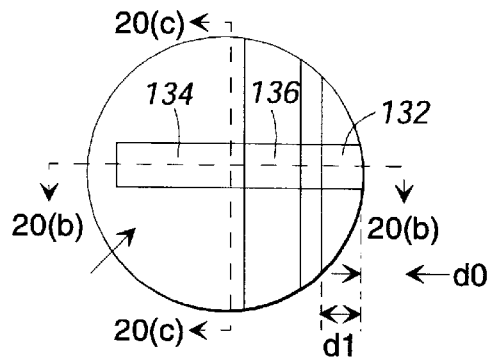
FIG. 20(a) illustrates a top view of a sonde head having dual-distance transducers at a single azimuthal location.
Figure 20C:
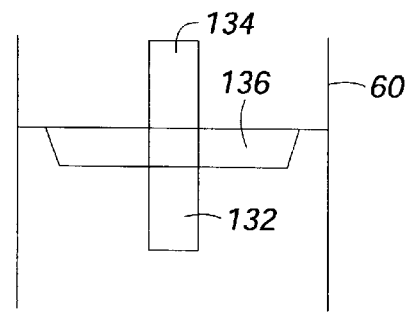
FIG. 20(c) illustrates a sectional view of the sonde head of FIG. 20(a) taken along line 20(c)—20(c).
Figure 20B:
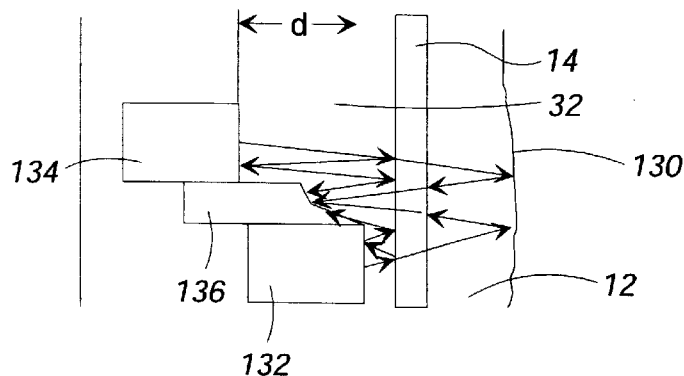
FIG. 20(b) illustrates a sectional view of the sonde head of FIG. 20(a) taken along line 20(b)—20(b).

FIGS. 20(*a–c*) illustrate a sonde head having dual-distance transducers at a single azimuthal location. In this embodiment, rotating head 60 includes a tilted receiving transducer 136 disposed between two transmitting transducers 134 and 132. Receiving transducer 136 is so narrow that no multiples are produced by reflections from its surface and that its main lobe receives radiation from both transmitting transducers 134 and 132. The transmitting transducers 134 and 132 each have a main lobe width that is selected to include the receiving transducer 136. Receiving transducer 136 lies within in the main lobe of the radiation pattern from each of transmitting transducers 132 and 134, but the transmitting transducer 132 lies within the null between the main lobe and the first side lobe of transmitting transducer 134, and likewise transmitting transducer 134 lies within the null between the main lobe and the first side lobe of transmitting transducer 132. This configuration permits the voxels in cement 12 to be essentially coincident for both dual-distance firings through fluid 32 and casing 14. The dual distance transducers may be used with other sets of transducers to form a more a complete image of the region behind casing. For example, the center transducer in FIG. 5 which is oriented in the normal direction relative to casing surface may incorporate the dual-distance transducer in FIGS. 20(*a–c*). In that embodiment, the intersection voxel 50 has the same azimuth for all three transducers shown in FIG. 5. As seen in FIGS. 20(*a–c*), the voxel elevations for the two transmitters are almost identical also. The localized intersection voxels 50 permit transducers to be sequentially fired as a helical swath is inspected. Since the head does not have to rotate or elevate to have both transmitters fire in a given voxel, the insonified helix can have any desired axial pitch. However, voxels are usually selected to overlap in the azimuthal direction to assure channel detection, as discussed above. In the axial direction, voxels may be nonoverlapping to permit faster inspection rates, as is also discussed above. Characterizing axial channels that permit fluid communication behind casing requires azimuthal but not axial overlap of voxels. The axial locations are shown as helical but may have other patterns which give the desired coverage to effectively characterize the axial connectivity of channels.

Figure 21:
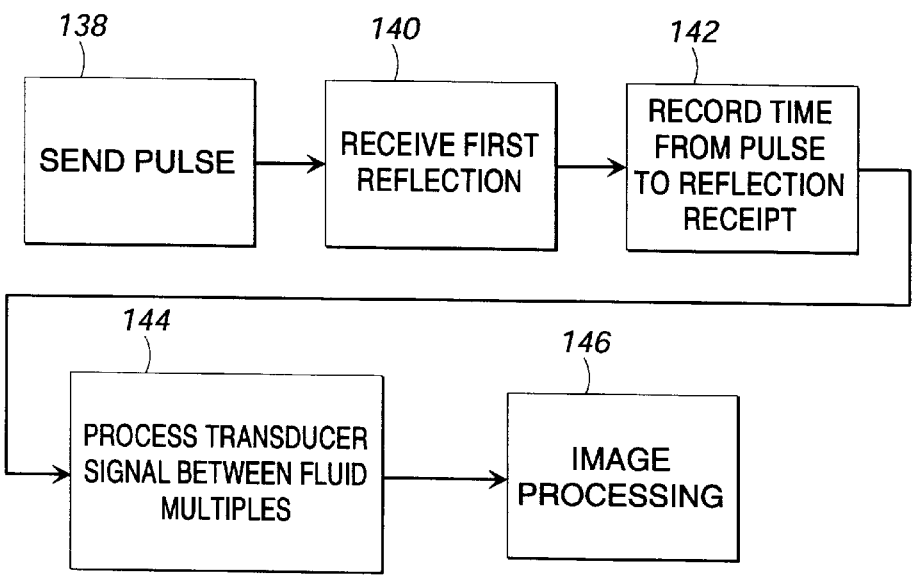
FIG. 21 illustrates a block diagram of the algorithm of the processing sequence for imaging behind reflective layers with a duial-distance transducer configuration in accordance with the present invention.

FIG. 21 illustrates a block diagram of the algorithm of the processing sequence for imaging behind reflective layers with a dual-distance transducer configuration in accordance with the present invention. Applicants have found that processing waveforms of FIG. 16 from both transducers also gives good signal to noise for all regions behind casing. Referring to FIG. 21, transducers 122 and 124 each send a pulse 126 and 128, respectively, as illustrated in block 138, producing the waveforms illustrated in FIG. 16. Each transducer receives its first reflection, 62 and 65, respectively, as indicated by block 140, and the time for reflection is recorded, as indicated by block 142. As indicated by block 144, the signals may then be processed in several forms. The processing means within the sonde 16 or digital computer 2 may combine waveforms from both transducers. For example, if neither waveform has a fluid multiple in a time window, the average of both waveforms is used in that window. Alternatively, time windows of one waveform having a fluid multiple may be disregarded while the other waveform is used without averaging for that spatial region behind casing 14. As discussed above, the timings of windows are calculated from the travel times to obtain the first reflection from the inner casing wall. Finally, the processing means in digital computer 2 or sonde 16 may further image process the processed waveforms to create the final image, as indicated by block 146.

IV. Multiple View Positioning

In an alternative embodiment of the present invention, the transducer configuration is arranged and configured to improve acoustic imaging of the region surrounding the rotating sonde head 60 (FIG. 1) by utilizing multiple collimated transducers. In this embodiment, multiple beams cover a spread of propagation directions relative to the radial direction, illustrated by arrow 44 in FIG. 22. As discussed above, in drilled wells, acoustic transducers are used to image the distance to a acoustically reflective surfaces, which represent occlusions or channels in concrete 12 surrounding casing 14. The timing and amplitude of reflected signals are processed to map azimuthal and radial locations of the reflective surfaces relative to the direction of propagation.

Figure 22:
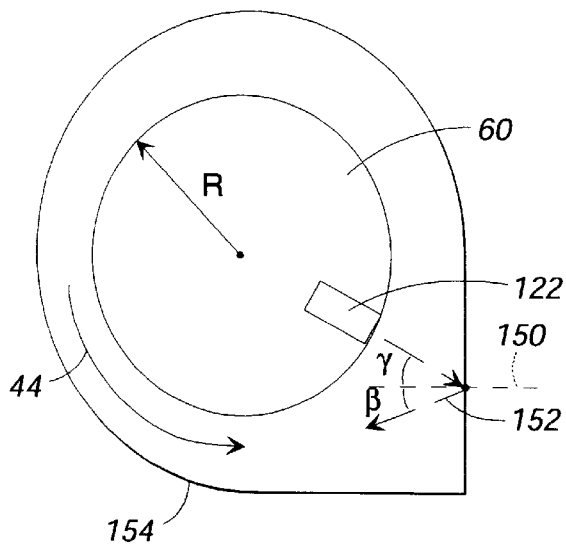
FIG. 22 illustrates a sonde head having only one pulse-echo transducer and its acoustic wave propagation with respect to an acoustically reflective surface.

If the reflector surface of an occlusion or channel is tilted relative to a normal the incident acoustic wave, reflected acoustic waves do not return to the receiving transducer, which causes the imaging method to fails. For example, FIG. 22 shows a configuration in which the propagating wave does not return to the rotating head 60. There, an acoustic wave propagates from pulse-echo transducer 22, reaches reflective surface 154, at an angle of incidence ox with respect to surface normal 150 and returns at an angle of reflection $\beta$, which is approximately equal to angle $\alpha$. The reflected wave misses the rotating sonde head 60 completely.

This embodiment of the present invention maps first reflector azimuthal and radial locations for a wide range of reflecting surface angles. The inventive configuration and method applies to not only a first reflecting surface encountered, but also to subsequent reflecting surfaces. Therefore, the inventive configuration may map casing surface 12, the casing-cement interface and the cement-earth formation interface using refracted waves media beyond the casing 14.

Figure 23:
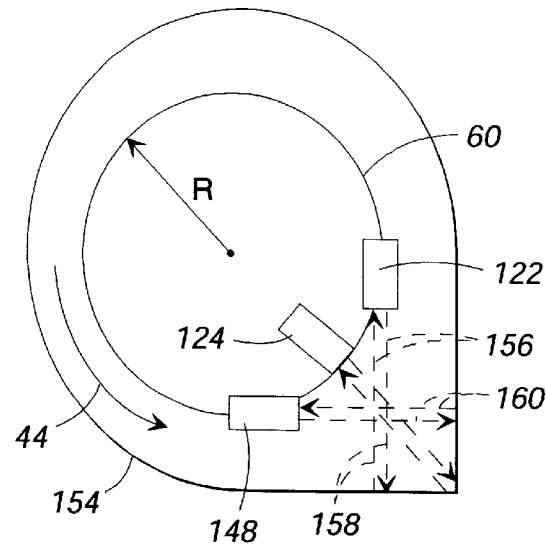
FIG. 23 illustrates an alternative embodiment of an acoustic transducer configuration having three transducers orientated to receive pulse-echo signals from perpendicular locations from a corner of a reflective surface.

This embodiment of the transducer configuration invention uses multiple transducers on a rotating head radially displaced from the center of rotation. For example, FIG. 23 shows three transducers 122, 124 and 148 in rotating head 60 having radius R. Each transducer insonifies (sends acoustic energy through) a fixed range of angles relative to the radial direction. Transducer 148 detects surface 154 orientation at location Z, which was previously undetectable for the transducer configuration illustrated in FIG. 22. Transducer 122 detects the surface 154 at location X, which was also undetectable for the transducer configuration illustrated in FIG. 22. Transducer 124 detects a corner reflector in the surface 154 at location Y.

Figure 24:
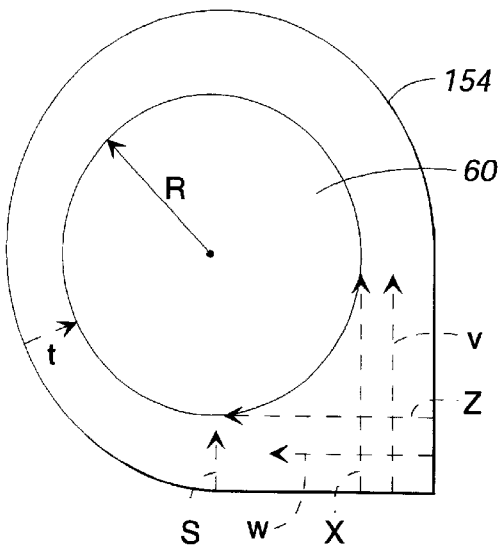
FIG. 24 illustrates normals to an acoustically reflective surface and various locations on the surface which may be images using the invention transducer configuration.

In the embodiment illustrated in FIG. 23, transducer beams are designed to have sufficient beamspread cover to have a range of propagation directions. The selection of a slight overlap of beamspreads from adjacent transducers obtains complete coverage of inspection directions relative to the radial direction. As the rotating sonde head 60 rotates, transducers remain a fixed radial distance from the center of rotation. In one full rotation, the boundary at surface 154 can be mapped. Reflecting surfaces perpendicular to any transducer beam return echoes to the corresponding transducer. FIG. 24 illustrates that reflecting surface normal vectors must intersect the rotating head 60 to be imaged. Surface normal vectors v and w do not intersect the tool head of radius R. Therefore, a larger head radius is required to image Locations v and w.

If the sonde 16 is carefully centered in casing 14, transducers 122, 124 and 148 have fixed angles of incidence with respect to casing 14. For example, in FIG. 25, refracted angles in casing 14 and cement 12 are related to angle of incidence via Snell's Law. The refracted angle in cement 12 is affected little by casing 14 and mostly by properties of fluid 32 and cement 12. With or without casing 14, reflective surfaces in cement 12 can be imaged, provided that the rotating head 60 is centered within a circular borehole in fluid 32. The ordinarily skilled artisan will also recognize this beamspread overlap configuration may be applied more generally to any set of imaging transducers provided that angles of incidence remain fixed as transducers are scanned along the surface between fluid 32 and cement 12. In particular, if transducers 122, 124 and 148 are in a pad that travels along the surface between fluid 32 and cement 12, incidence angles can be carefully controlled. This pad configuration may have many applications including that of cement imaging in cased wells.

Figure 26:
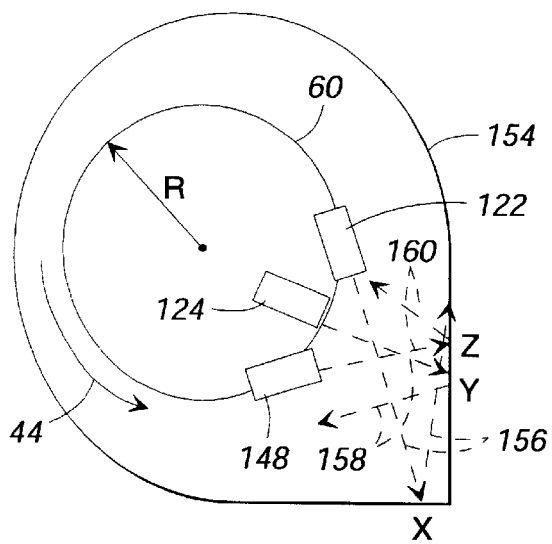
FIG. 26 illustrates scattering of acoustic wave propagation when no transducers within a configuration are aligned with a reflecting surface, which is useful for imaging tilted surfaces.

FIG. 26 shows the rotating sonde head 60 rotated slightly counterclockwise from the position in FIG. 23. No reflected waves return to the transducer from which they were transmitted. However, the acoustic wave 160 from transducer 148, however, does return to the transducer 122. This pitch-catch operation of transducers 122 and 148 aids in imaging tilted reflective surfaces. For example, a location X, now similar to location v in FIG. 24, the reflected acoustic wave 156 from transducer 122 does not does not return to transducer within the configuration. In this example larger rotating head 60 may be needed to detect location X.

Figure 27:
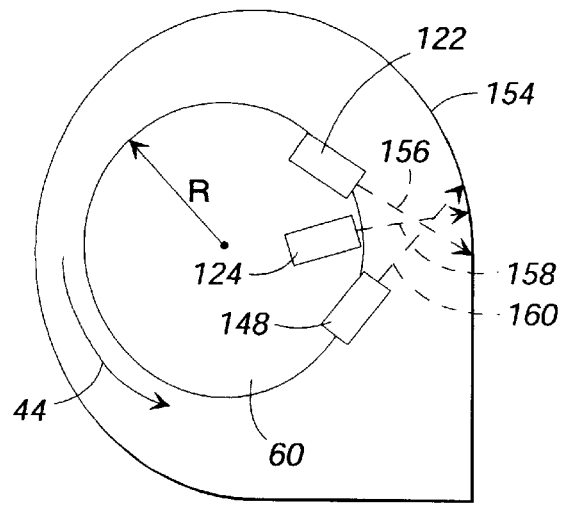
FIG. 27 illustrates an alternative embodiment of the transducer configuration.

FIG. 27 shows transducer 124 transmitting radially, having a beam 158 which strikes the reflecting surface 154 at normal incidence. When the borehole surface is circular and concentric with the rotating head 60, radially-directed transducers can operate in either pulse-echo or pitch-catch modes. When operating in a pitch-catch mode, the nulling reverberation method described above with the vertical configuration of a transducer pair used may be utilized. Therefore, the top view in FIG. 27 applies to either pulse-echo or pitch-catch modes. FIG. 5 illustrates a top view for imaging behind casing in that matter, wherein nulling of casing reverberations enhances imaging signals associated with the cement 12. FIGS. 2 and 4 show vertical views for pulse-echo and pitch-catch modes, respectively.

As described above, the inventive apparatus 10 must process data for each direction of insonification for each azimuthal orientation of the rotating head 50. Images are constructed by dividing material surrounding the head into voxels as shown in FIG. 5 and recording reflective energy for each voxel, for each transducer. For each voxel, a summed weighting of signals from all transducers is used to obtain an estimated reflectivity and probable reflective surface orientation for the voxel.

By linking amplitude contours and surface orientation contours, the inventive system forms a map by connecting the contours from voxel to voxel. The first strong intensity change is called standoff. A map of standoff versus azimuthal orientation of the rotating head 60 gives a caliper of the first reflective boundary. If the first boundary is the borehole wall, the image provides borehole wall geometry and hence becomes a borehole caliper.

Figure 25:
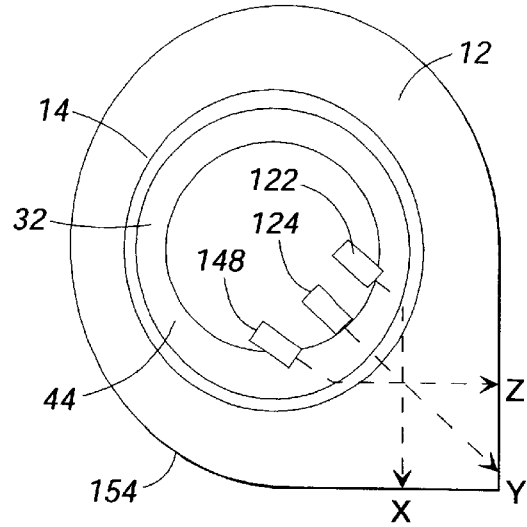
FIG. 25 illustrates an alternative embodiment of the inventive transducer configuration for imaging a surface behind an acoustically reflective layer by using refracted acoustic waves.

To image behind casing as in FIG. 25, voxels can be mapped just for the region behind casing as shown in FIG. 5. Several approaches can be used to improve imaging of reflectors behind casing. In FIGS. 25 and 5, the central transducer radiates along the casing 14 diameter and receives strong echoes from casing inside diameter (ID), wall thickness and wall reverberation. To image a reflector (e.g. an occlusion or channel) within cement 12 behind casing 14, the reflector normal must be collinear with the diameter of casing 14. In this case, the above-described dual-distance transducer configuration offers an approach to reduce problems with multiple reverberations in casing fluid 32 that obscure echoes from reflectors within the cement 12 or the earth formation behind casing 14.

The two outer transducers in FIGS. 25 and 5 have propagation directions at angles with the casing diameter. Incidence angles for waves entering casing affect not only casing reverberations but also refraction angles. As discussed above, incidence angles can be selected to strengthen refracted waves behind casing 14 while weakening casing reverberations reaching the receiving transducer. To inspect a range of angles behind casing, incidence angles of beams for Transducers 122 and 148 can be selected to overlap the beam of transducer 124 in an overlap voxel as shown in FIG. 5. This overlap improves imaging for non-overlapping helical spiral inspection paths. The incidence angles are selected to obtain the desired range of refracted angles behind casing. As illustrated in FIG. 25, refracted angles remain constant relative to the casing diameter as the head 60 rotates azimuthally. A reflective surface within the cement 12 behind casing 14 returns a signal when any transducer produces a wave propagating collinear to a reflective surface normal.

In general, the concept of designing transducers with multiple viewing position imaging as illustrated in FIG. 25 has application to situations amenable to a rotating head 60 for inspecting surroundings to identify and locate irregularly shaped acoustic boundaries. Besides wells, sewers, pipelines and in vivo passages could be inspected from the interior. The ordinarily skilled artisan, however, will recognize that the rotating head 60 and cylindrical geometry of the sonde 16 are not essential to the transducer configuration concepts disclosed herein. The inventive apparatus and method applies to any configuration having voxels in a first medium (e.g., cement 12) inspected from multiple angles using multiple transducers in a second medium (e.g., fluid 32) that scan the boundary between the first and second media. The first medium (e.g., cement 12) can be inspected using heads on either interior or exterior boundaries.

Figure 28A:
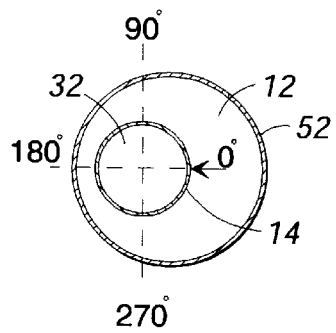
FIG. 28(a) illustrates another test specimen for use with an alternative embodiment of the transducer configuration.
Figure 28B:
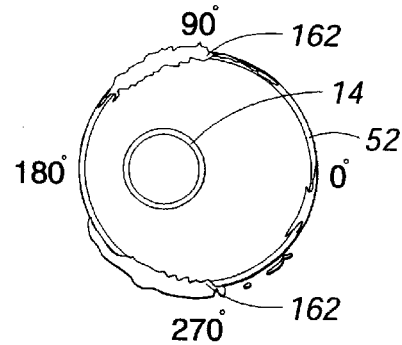
FIG. 28(b) illustrates acoustically image specimen illustrated in FIG. 28(a), wherein the specimen includes an inner casing eccentered relative to a cement-steel casing boundary.

FIG. 28(a) shows a specimen which includes casing fluid 32 (water), inner casing 14, cement 12 and an outer casing 52 (simulated hard formation). The laboratory version of the transducer configuration included transducers in specimens containing the essential features encountered downhole. The specimen shown in FIG. 28(a) was inspected by placing three pairs of transducers inside the inner casing. FIG. 4 shows a side view of one pair of transducers. FIG. 5 shows a top view of the three pairs of transducers. A fourth pair of transducers oriented the same as the central pair (FIGS. 5 and 4) but at a different distance from the casing 14 to reduce reverberation problems in the fluid 32, as described above in the dual distancing section. FIG. 28(b) illustrates an image formed using the processing techniques disclosed herein. Darker images imply stronger reflections. The dark gray regions coinciding with a circle depicting the cement-to-outer casing boundary 162 demonstrate imaging of a reflecting surface eccentered from inner casing 14. No existing commercial system can produce an image of this boundary.

As discussed above, the rotating sonde head includes apertures for exposing the transducer faces to the fluid 32 within the wellbore. Aperture modeling traces rays on collimated and divergent edges of transducer-radiation patterns. A method in accordance with the present invention simplifies analysis of size transducer faces to select beam patterns. The inventive method utilizes a model which estimates collimation and divergence of beams passing from transmitter through casing fluid 32, casing 14 and cement 12 and returning to a receiving transducer. As discussed above, FIG. 2 schematically illustrates beamspread geometry in the axial (vertical) plane; and FIG. 5 shows central rays for three radial-plane-transducer pairs (radial-plane rays are top views of axial-plane rays in FIG. 2). The central ray of the center transducer pair 30 illustrated in FIG. 5 propagates along a casing radius and enters cement 12 normal to the casing surface.

On the other hand, rays from the outer transducer pairs 44 and 46 in FIG. 5 are parallel to the ray associated with the center pair 30, but offset. This offset corresponds to tilting pair faces as illustrated in FIG. 25. The tilting pair faces comprise an incidence angle, $\theta_i$. One outer pair tilts clockwise and the other counterclockwise.

Figure 29:
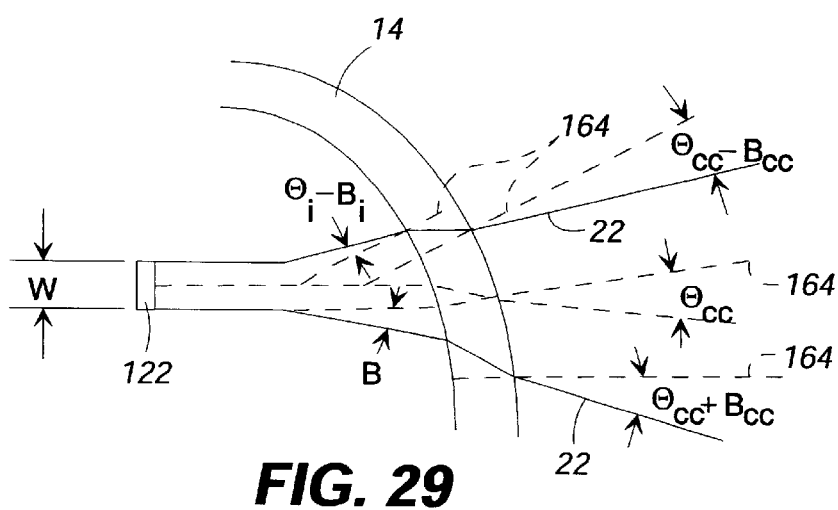
FIG. 29 illustrates a top view of a beamspread of a rectangular transducer pair which provides the image illustrated in FIG. 28, having half amplitude paths that refract clockwise at the cement-steel casing boundary.

The beam pattern for the clockwise transducer in FIGS. 25 or 5 is shown in FIG. 29. The central ray refracts at clockwise angle, $+\theta_{cc}$, relative to casing normal at the steel-to cement interface. At the beam edges, the beamspread angle, B, contributes to the angle of incidence. The resulting refraction angle at the left edge is $\theta_{cc}-B_{cc}$ and at the right, $\theta_{cc}+B_{cc}$. The edge and center rays from the counterclockwise pair mirror those of FIG. 29 which results mathematically by substituting $+\theta_{cc}=-\theta_{ccc}$; and $B_{cc}=-\theta_{ccc}$.

The center pair in FIG. 5 has central-ray-refracted angle, $\theta_{cn}=0$. Incidence angles of rays at half-amplitude edges of the beam depend on B and on casing curvature. In cement 12 beyond casing 14, refracted beamspreads are $-B_{cn}$ at the left edge and $+B_{cn}$ at the right edge. FIG. 5 also illustrates the essence of multiple-viewing-position (MVP) imaging for the cement annulus. As discussed above, that configuration allows each voxel to be interrogated from multiple directions. Multiple steering angles require transducer-radiation patterns adequately collimated in cement to prevent interference from reflectors in adjacent voxels. Beamspread, controlled by transducer size and frequency, is optimized to detect all relevant-reflector angles with the fewest transducer pairs.

Transducer radiation patterns can be selected to obtain complete coverage of relevant reflector angles. For coverage with three transducer pairs, select beamspread, $B_{cn}$, of the center pair as $$+B_{cn}=+\theta_{cc}-B_{cc} \text{ and } -B_{cn}=+\theta_{ccc}-B_{ccc} \tag{11}$$

where $+B_{cn}$ is clockwise spread and $-B_{cn}$, counterclockwise spread of the central pair.

In FIG. 29, the left edge of the clockwise beam lies at an angle of $\theta_{cc}-B_{cc}$ from the casing normal. Angles closer to the normal are outside the beam of the clockwise pair. Equation 11 assures that the central pair interrogates angles from 0° to $\theta_{cc}-B_{cc}$ relative to the casing normal. For the counter-clockwise pair, the angle from the right edge to the normal is $\theta_{ccc}-B_{ccc}$, and $-B_{cn}$ of the central pair covers this angular region. Several aperture design trade-offs must be considered to select $\theta_{cc}$, $B_{cc}$ and $B_{cn}$ for the radial plane.

Regarding the first trade-off, one objective includes configuring the $\theta_{cc}$ angle to cover all relevant reflector orientations. A large $\theta_{cc}$ angle requires large $B_{cc}$ and $B_{cn}$ angles to cover all reflector orientations. Large $B_{cc}$ and $B_{cn}$ angles give a large transverse extent for far voxels and hence poorer channel resolution. If channel resolution is a problem, more than three transducer pairs will be needed to adjust $B_{cc}$ and $B_{cn}$. The first trade-off, therefore, optimizes the dual conditions: (1) a small number of transducers for higher tool reliability and lower cost tool; and (2) a small voxel size for good resolution of channels.

With regard to a second trade-off, a second goal is achieving fast logging speeds. Logging speed depends on the rotation speed of the sonde head 60, transducer firing rate and helical coverage. As the transducer head 60 rotates, radiation patterns also rotate relative to the stationary casing 14. As best illustrated in FIG. 5, as the head 60 rotates, each voxel is interrogated by all three beams. For nonintersecting voxels, each beam interrogates the voxel at a different rotational position of the head. For example, in FIG. 5 transducer 48 investigates far voxel 40. As the head 60 rotates in a further clockwise direction, transducers 46 and 30 also investigate far voxel 40.

For large helical pitches, the voxel axial length illustrated in FIG. 4 controls axial coverage per rotation. Valid coverage requires interrogating each voxel from each viewing angle at a single axial depth in the well. In FIG. 5, far voxels 42 and 40 are separated by intervening far voxel 38. The center and clockwise transducer pairs 30 and 44 must rotate to interrogate far voxel 40 utilizing rays cc and n, respectively. Far voxel 40 will be interrogated in three different firing sequences. For large helical pitches during fast logging speeds, the transducer pair 44 could translate axially during this rotation. The resultant non-overlapping axial coverage could invalidate the criteria for inspecting each voxel from all relevant angles in the radial plane, however, the inventive system accounts for differing axial heights of each successive interrogation, as described above my recording axial position for each far voxel measurement. On the other hand, during a single firing sequence, all three beams rapidly interrogate the intersection voxel 50 with very little rotation between firings. For the intersection voxel 50, therefore, logging speeds can be faster than for widely separated far voxels.

The second trade-off involves minimizing the separation between far voxels. Referring back to FIGS. 29, for large $\theta_{cc}$ angles, however, this best condition for far voxels has the disadvantage of maximizing the separation for near voxels. The second trade-off optimizes a trio of conditions: (1) small separations for far voxels; (2) small separations for near voxels; and (3) a large $\theta_{cc}$ angle. The resultant transducer configuration will insonify a helical swath of voxels when rotating and while translating axially in the borehole. The axial length of the swath will be the axial length of the voxel of interest, as illustrated in FIG. 4. Although radial overlapping is required to achieve 10° resolution of channels, axial overlapping is unnecessary for interpreting channel connectivity. A swath once every 3 inches of axial travel is acceptable according to marketing surveys completed by Applicants, which show that as few as three measurements per radial plane give valid calipering (to determine cement thickness for formation evaluation).

The third trade-off involves beamspread angle, B, in FIG. 29 (or β in FIG. 2). B depends on $V_i$, w, f, and frequency bandwidth $\Delta f$. Minimum B depends on:

$$w/\lambda = w*f/V_i \tag{12}$$

Bandwidth, $\Delta f$, and multimode speeds of sound, $V_i$, give rainbow-like spectral broadening of angle B. Narrow bandwidths improve beam-edge definition and hence voxel-transverse edges. As a penalty, narrow bandwidths give poor resolution in the propagation direction because wave packet time duration increases. Frequency-dependent attenuations in drilling fluid and cement also broaden B. Large f gives small B, giving better control of voxel size, but reduces signal strength due to attenuation. Fitting all transducers into the 3⅜" outside diameter of rotating head 60 constrains w.

The third trade-off, therefore, optimizes the six considerations: (1) high frequencies for small voxels; (2) low frequencies for penetration through drilling fluid and cement; (3) small bandwidths for good voxel resolution in the transverse direction; (4) large bandwidths for good voxel resolution in the propagation direction; (5) wide transducer elements for good voxel transverse resolution; and (6) narrow transducer elements to permit a small outside diameter for rotating head 60 for a small inside diameter of casing 14. As discussed above, data processing algorithms include wavelet modeling to derive optimum frequencies, bandwidths and transducer widths for voxel resolution.

Another important aspect of the present invention involves selecting transducer radiation pattern angles. More specifically, an important finding is the need for a range of refraction angles to obtain cement-to-formation reflections for an eccentered casing. FIGS. 30 and 31 illustrate rotating head 60 in a clockwise direction, as shown by arrow 44, within a cement-formation boundary 130, to show that two transducer pairs are needed to interrogate opposite halves of the formation wall for an eccentered casing (not shown). For example, in FIG. 30, rays 160 and 158 for transducer pairs 148 and 124, respectively do not return to rotating head 60 after reflection from the cement boundary 130, whereas only ray 156 returns to its originating transducer pair 122. Similarly, in FIG. 31, when rotating head is offset almost 180° from the position of FIG. 30, ray 160 from transducer pair 148 returns to transducer pair 148 whereas rays 156 and 158 do to reach their originating transducer pairs 122 and 124 after reflection from cement-formation boundary 130. Thus for each azimuthal position of rotating head 60, at least one transducer pair must include in its radiation pattern a normal to an occlusion or channel within the cement 12.

FIGS. 32(*a*) and 32(*b*) show that each multiple-viewing-position beam detects a cylindrical channel, but that beams interrogate cylinders from different refraction angles in cement. Specifically, in FIG. 32(*a*), note that casing 14 refracts and focuses rays from transducer pairs 122, 124, and 148 on an intersection voxel as the sonde head rotates in the direction indicated by arrow 44 toward channel 78. As the transducer configuration rotates toward the occlusion 78, note that casing 14 focuses each of rays 156, 158 and 160 from transducers 122, 124 and 148 on an outer periphery of channel 78 in a near voxel.

FIG. 33 shows that when the intersection voxel is not at the center of the channel 78, transducers 122, 124 and 148 do not receive reflections simultaneously from channel 78, and obtain a reflection from a cylinder at a different head azimuth. For example, in the azimuthal position illustrated in FIG. 33, rays 156 and 160 deflect from channel 78. Thus, only rays which travel coincident with a center of the channel 78 reflect back to the originating transducer pair, as is illustrated by ray 158.

For typical casing sizes, the technique uses transducers of similar frequency (400 kHz), bandwidth (400 kHz), size (1.0 in.×0.4 in.) to those used in pulse-echo cement bond tools. Such transducers are built to withstand downhole temperatures of at least 350° F. and pressures at least 20,000 psi. The transducers are mounted on a rotating head similar to that of a conventional pulse-echo tool. The head requires accurate mounting angles and centralization in the bore of the casing to assure that the radiation patterns propagate in the required directions with the required standoff from casing.

The tool for the new technique requires sufficient slip-ring connections from each transducer element to the electronics in the stationary part of the tool. The system also includes sufficient downhole processing capability to perform signal enhancement and data compression, as discussed above. Additionally, the inventive system utilizes a telemetry data rate of approximately 180,000 bits per second to transmit information to the surface. The system also includes means for measuring transducer azimuth and elevation to create images as a function of depth in the well. Direction sensors in the tool-record orientation of the head. Logging sensors at the surface record elevation in the well. The amount of overlap between adjacent voxels is determined by the sampling rate and rotational speed of the head.

As schematically illustrated in FIG. 1, digital computer 2 provides surface processing which is capable of reconstructing the compressed data transmitted along wireline 8. Additionally, the inventive system includes conventional image displays 4 for forming images of the region behind cement from algorithms which perform the required processing from compressed data to acceptable images.

The inventive system is unique in that no existing commercial tools can image channels anywhere in the cement annulus 12 and caliper the radial thickness of the cement 12 as a function of azimuth and axial location. No existing instrumentation utilizes the concepts of enhancing data downhole to suppress reverberations, compressing data downhole for transmission and reconstructing data uphole to form images of reflectors behind a strongly reflective boundary. This inventive system can be of use in a variety of applications. Some examples include but are not limited to imaging cement in a dam using transducers in the water behind the dam, imaging organs in vivo through highly reflective tissue, imaging the contents of sunken ships and determining the location of water passages behind highly reflective structures such as swimming pool walls, etc.

The foregoing has been illustrative of the features and principles of the present invention. Various changes or modifications to the invention may be apparent to those skilled in the art without departure from the spirit and scope of the invention. All such changes or modifications are intended to be included herein and within the scope of the invention.

What is claimed is:

1. A transducer configuration for use in acoustically imaging a target region behind an acoustically reflective layer, the transducer configuration comprising:

an in-the-oil-patch sonde having a rotating head constructed and arranged to support a plurality of transducers, the rotating head having a geometrical center;

a first transducer disposed within the rotating head at a first distance from the geometrical center, the first transducer for generating a first acoustic pulse and for receiving a first acoustic signal comprising a first reflection from the acoustically reflective layer, a first set of fluid multiples arising from reflections between the acoustically reflective layer and a surface of the first transducer, and a first signal associated with the target region; and a second transducer disposed within the rotating head at a second distance from the geometrical center, the first distance being at least one wavelength different than the second distance, the second transducer for generating a second acoustic pulse and for receiving a second acoustic signal comprising a second reflection from the acoustically reflective layer, a second set of fluid multiples arising from reflections between the acoustically reflective layer and a surface of the second transducer, and a second signal associated with the target region; and an adaptive multiplier mechanism configured to receive and process signals received by the first transducer and the second transducer at time intervals which occur between receipt of the first and second sets of fluid multiples, respectively, the adaptive multiplier mechanism configured to create a canceling signal having amplitude valleys therein such that the canceling signal promotes cancellation of the first and second sets of fluid multiples from the first and second acoustic signals, respectively.

2. The transducer configuration of claim 1 further comprising:

a mechanism for calculating an arrival time at the first transducer and the second transducer of fluid multiples based on acoustic wave travel time defined by a time interval between an acoustic pulse made by a transducer and receipt by that same transducer of the acoustic pulse reflection from the acoustically reflective layer.

3. The transducer configuration of claim 1 further comprising:

a mechanism for averaging signals generated by the first transducer and the second transducer during time intervals between receipt of fluid multiples, when the time intervals for the first and second transducers occur simultaneously.

4. The transducer configuration of claim 1 further comprising:

a mechanism for processing a signal generated by only one of the first transducer and the second transducer at time intervals when the other of the first transducer and the second transducer receives fluid multiples.

5. The transducer configuration of claim 1 wherein the first transducer and the second transducer are disposed in a vertically tandem relationship.

6. The transducer configuration of claim 1 wherein the first transducer and the second transducer are circumferentially distributed about the geometrical center of the rotating head.

7. The transducer configuration of claim 1 further comprising:

a transducer pair comprising the first transducer and the second transducer;

the rotating head including three transducers pairs disposed in a circumferentially adjacent relationship, wherein each transducer pair senses the same location with the target region for a given azimuthal position.

8. The transducer configuration of claim 7 wherein:

the first transducer pair and the third transducer pair comprise pitch-catch transducer pairs; and the second transducer pair comprises a pulse-echo transducer pair, wherein the second transducer pair is disposed between the first transducer pair and the third transducer pair with respect to a circumference of the rotating head.

9. A transducer configuration for use in acoustically imaging a target region behind an acoustically reflective layer, the transducer configuration comprising:

a rotating head constructed and arranged to support a plurality of transducers, the rotating head having a geometrical center;

a first transmitting transducer disposed within the rotating head at a first distance from the geometrical center, the first transmitting transducer including a beamspread radiation pattern comprising a main lobe diverging from the first transmitting transducer, a side lobe disposed laterally adjacent to the main lobe, and a null region disposed between the main lobe and the side lobe, wherein the first transmitting transducer is adapted to generate a first acoustic pulse; and a second transmitting transducer disposed within the rotating head at a second distance from the geometrical center, the first distance being at least one wavelength greater than the second distance, the second transmitting transducer including a beamspread radiation pattern comprising a main lobe diverging from the second transmitting transducer, a side lobe disposed laterally adjacent to the main lobe, and a null region disposed between the main lobe and the side lobe, the second transmitting transducer adapted to generate a second acoustic pulse;

a receiving transducer vertically disposed beneath the first transmitting transducer and above the second transmitting transducer;

a receiving surface on the receiving transducer disposed at a nonparallel orientation with respect to a vertical plane for detecting echoes from the first transmitting transducer and the second transmitting transducer, wherein the receiving surface includes a receiving beamspread radiation pattern having a main lobe diverging therefrom constructed and arranged to detect echoes from the first transmitting transducer and the second transmitting transducer, and wherein the receiving surface dissipates acoustic reflections therefrom, thereby precluding receipt on the receiving surface of acoustic echoes associated therewith.

10. The transducer configuration of claim 9 wherein the main lobe of each transmitting transducer encompasses the main lobe of the receiving transducer, and wherein each transmitting transducer lies within the null region disposed between the main lobe and the first side lobe of the other transmitting transducer.

11. The transducer configuration of claim 9 further comprising:

a transducer set including the first transmitting transducer the second transmitting transducer and the receiving transducer;

the rotating head including three transducer sets disposed in a circumferentially adjacent relationship, wherein each transducer set senses the same location within the target region for a given azimuthal position.

12. In a transducer configuration for use in acoustically imaging a target region behind an acoustically reflective layer, wherein the transducer configuration includes a rotating head having a geometrical center and is constructed and arranged to support a plurality of transducers, a method comprising the steps of:

placing a first transducer within the roating head at a first distance from the geometrical center;

generating a first acoustic pulse with the first transducer;

receiving a first acoustic signal with the first transducer comprising a first reflection from the acoustically reflective layer, a first set of fluid multiples arising from reflections between the acoustically reflective layer and a surface of the first transducer, and a first signal associated with the target region;

placing a second transducer disposed within the rotating head at a second distance from the geometrical center the first distance being at least one wavelength greater than the second distance;

generating a second acoustic pulse with the second transducer;

receiving a second acoustic signal with the second transducer comprising a second reflection from the acoustically reflective layer, a second set of fluid multiples arising from reflections between the acoustically reflective layer and a surface of the second transducer, and a second signal associated with the target region;

creating a canceling signal having amplitude valleys therein such that the canceling signal promotes cancellation of the first set of fluid multiples and the second set of fluid multiples from the first acoustic signal and the second acoustic signal respectively; and processing signals received by the first transducer and the second transducer at time intervals which occur between receipt of the first set of fluid multiples and the second set of fluid multiples, respectively, wherein signal values at time intervals between receipt of the first set of fluid multiples and the second set of fluid multiples provide acoustic waveforms associated with the target region.

13. The method of claim 12 further comprising the further step of:

calculating an arrival time at the first transducer and the second transducer of fluid multiples based on acoustic wave travel time defined by a time interval between an acoustic pulse made by a transducer and receipt by that same transducer of the acoustic pulse reflection from the reflective layer.

14. The method of claim 12 comprising the further step of:

averaging signals generated by the first transducer and the second transducer during time intervals between receipt of fluid multiples, when the time intervals for the first transducer and the second transducer occur simultaneously.

15. The method of claim 12 comprising the further step of:

processing a signal generated by only one of the first transducer and the second transducer at time intervals when the other of the first transducer and the second transducer receives fluid multiples.

16. The method of claim 12 comprising the further step of:

placing the first transducer and the second transducer in a vertically tandem relationship.

17. The method of claim 12 comprising the further step of:

circumferentially distributing the first transducer and the second transducer about the geometrical center of the rotating head.

18. The method of claim 12 comprising the further steps of:

creating transducer sets, each including the first transducer and the second transducer;

disposing three transducer sets in a circumferentially adjacent relationship on the rotating head; and sensing the same location within the target region for a given azimuthal position.

19. In a transducer configuration for use in acoustically imaging a target region behind an acoustically reflective layer, wherein the transducer configuration includes a rotating head having a geometrical center, the rotating head constructed and arranged to support a plurality of transducers, the method comprising the steps of:

placing a first transmitting transducer disposed within the rotating head at a first distance from the geometrical center;

generating a first beamspread radiation pattern with the first transmitting transducer comprising a main lobe diverging from the first transmitting transducer, a side lobe disposed laterally adjacent to the main lobe, and a null region disposed between the main lobe and the side lobe;

generating a first acoustic pulse with the first transmitting transducer;

placing a second transmitting transducer within the rotating head at a second distance from the geometrical center, the first distance being at least one wavelength different than the second distance;

generating a second beamspread radiation pattern comprising a main lobe diverging from the second transmitting transducer, a side lobe disposed laterally adjacent to the main lobe, and a null region disposed between the main lobe and the side lobe, the second transmitting transducer adapted to generate a second acoustic pulse;

vertically disposing a receiving transducer beneath the first transmitting transducer and above the second transmitting transducer;

orientating a receiving surface of the receiving transducer at a nonparallel orientation with respect to a vertical plane for detecting echoes from the first transmitting transducer and the second transmitting transducers;

generating a receiving beamspread radiation pattern having a main lobe diverging from the receiving surface;

detecting with the receiving beamspread radiation pattern echoes from the first transmitting transducer and the second transmitting transducer; and dissipating acoustic reflections from the receiving surface, thereby precluding receipt on the receiving surface of acoustic echoes associated therewith.

20. The method of claim 19 comprising the further steps of:

encompassing the main lobe of the receiving transducer with each transmitting transducer; and positioning each transmitting transducer within the null region between the main lobe and the first side lobe of the other transmitting transducer.

21. The method of claim 19 comprising the further steps of:

creating a transducer set including the first transmitting transducer, the second transmitting transducer and the receiving transducer;

disposing three transducer sets in a circumferentially adjacent relationship on the rotational head; and utilizing all three transducer sets to sense the target region at the same location for a given azimuthal position.

* * * * *